US012050643B2

United States Patent
Kashino et al.

(10) Patent No.: US 12,050,643 B2
(45) Date of Patent: Jul. 30, 2024

(54) SOUND SIGNAL DATABASE GENERATION APPARATUS, SOUND SIGNAL SEARCH APPARATUS, SOUND SIGNAL DATABASE GENERATION METHOD, SOUND SIGNAL SEARCH METHOD, DATABASE GENERATION APPARATUS, DATA SEARCH APPARATUS, DATABASE GENERATION METHOD, DATA SEARCH METHOD, AND PROGRAM

(71) Applicants: NIPPON TELEGRAPH AND TELEPHONE CORPORATION, Tokyo (JP); The University of Tokyo, Tokyo (JP)

(72) Inventors: Kunio Kashino, Kanagawa (JP); Shota Ikawa, Tokyo (JP)

(73) Assignees: NIPPON TELEGRAPH AND TELEPHONE CORPORATION, Tokyo (JP); The University of Tokyo, Tokyo (JP)

( * ) Notice: Subject to any disclaimer, the term of this patent is extended or adjusted under 35 U.S.C. 154(b) by 291 days.

(21) Appl. No.: 17/613,068

(22) PCT Filed: Apr. 8, 2020

(86) PCT No.: PCT/JP2020/015794
§ 371 (c)(1),
(2) Date: Nov. 21, 2021

(87) PCT Pub. No.: WO2020/241073
PCT Pub. Date: Dec. 3, 2020

(65) Prior Publication Data
US 2022/0318299 A1 Oct. 6, 2022

(30) Foreign Application Priority Data
May 24, 2019 (JP) .................................. 2019-097311

(51) Int. Cl.
*G06F 16/632* (2019.01)
*G06F 16/683* (2019.01)
(Continued)

(52) U.S. Cl.
CPC .......... *G06F 16/634* (2019.01); *G06F 16/683* (2019.01); *G10L 19/0204* (2013.01); *G10L 19/09* (2013.01)

(58) Field of Classification Search
None
See application file for complete search history.

(56) References Cited

U.S. PATENT DOCUMENTS

2002/0147592 A1    10/2002  Wilmot et al.
2018/0276540 A1*    9/2018  Xing ...................... G06N 3/084
(Continued)

FOREIGN PATENT DOCUMENTS

JP    2002-366552 A    12/2002
JP    2006-58567 A      3/2006

OTHER PUBLICATIONS

Okamoto et al. (2016) "Sound-effects Exploratory Retrieval System Based on Various Aspects (SERVA): Development of SERVA and User Observation", DEIM Forum 2016, E3-6, with English translation generated by computer.
(Continued)

*Primary Examiner* — Walter F Briney, III

(57) ABSTRACT

To provide database generation techniques that can accurately and efficiently generate a database useable in text-based sound signal search. A sound signal database generation apparatus includes: a latent variable generation unit that generates, from a sound signal, a latent variable corresponding to the sound signal using a sound signal encoder; a data generation unit that generates a natural language representation corresponding to the sound signal from the latent
(Continued)

variable and a condition concerning an index for a natural language representation using a natural language representation decoder; and a sound signal database generation unit that generates a record including the natural language representation corresponding to the sound signal and the sound signal from the natural language representation corresponding to the sound signal and the sound signal, and generates a sound signal database made up of the record.

23 Claims, 20 Drawing Sheets

(51) Int. Cl.
  *G10L 19/02* (2013.01)
  *G10L 19/09* (2013.01)

(56) References Cited

U.S. PATENT DOCUMENTS

2020/0349975 A1* 11/2020 Krishnamurthy ...... G11B 27/34
2022/0093082 A1* 3/2022 Zou ....................... G06F 40/284

OTHER PUBLICATIONS

Ikawa et al. (2018) "Audio Signal Search with an Onomatopoeia Query based on the Latent Variables" Acoustical Society of Japan, 2018 Autumn Meeting Acoustical Society of Japan Oita University, Oita Sep. 12-14, 2018, CD-ROM 2-2-1, published on Aug. 29, 2018 with English translation generated by computer.
NTT News Release (2019) "Development of technology to explain sounds in words ~can dictate sounds other than the spoken voice of~" May 27, 2019, <URL : https://www.ntt.co.jp/news2019/1905/190527b.html> with English translation generated by computer.
NTT communication Science Laboratories (Booklet) Open House 2019 held on May 30-31, 2019 <URL: http://www.kecl.ntt.co.jp/openhouse/2019/download.html> with its English translation generated by computer.
Ikawa et al. (2019) "Neural Audio Captioning Based On Conditional Sequence-To-Sequence Model" Detection and Classification of Acoustic Scenes and Events 2019, Oct. 25-26, 2019, New York, NY, USA, <URL: http://dcase.community/documents/workshop2019/proceedings/DCASE2019Workshop_Ikawa_82.pdf> <URL: http://dcase.community/articles/dcase2019-best-paper-awards>.

* cited by examiner

| | |
|---|---|
| NUMBER OF WORDS: HIGH | NUMBER OF WORDS: LOW |
| LOW, ECHOING SOUND | LOW SOUND |
| A SHORT WHISTLE BLOWS ONLY MOMENTARILY | A WHISTLE BLOWS |

HIGHER ⇐ ... ⇒ LOWER

| Sound source | Model | c | Generated captions |
|---|---|---|---|
| Snapping fingers | SCG | | A light sound is produced only momentarily. |
| | CSCG | 20 | Fingers are snapped. |
| | | 50 | Sound without pitch like a finger snap is produced once. |
| | | 80 | A short, light sound without pitch like a finger snap is produced once at low volume. |
| | | 110 | A short, light sound without pitch like a finger snap is produced once at low volume. |
| Bass drum | SCG | | A low sound echoes only momentarily. |
| | CSCG | 20 | A low sound is produced only momentarily. |
| | | 50 | A low hitting sound like a bang against Tatami booms only momentarily. |
| | | 80 | A drum is played only once at very low pitch unenthusiastically. |
| | | 110 | A light and a little low sound like hitting something is produced momentarily at very low pitch unenthusiastically and immediately goes off. |
| Contrabass | SCG | | A car engine echoes at low pitch. |
| | CSCG | 20 | A low sound is echoing. |
| | | 50 | A dull and low sound is echoing. |
| | | 80 | A slightly low machine sound gradually lowers and braking sound starts to be heard. |
| | | 110 | A slightly low machine sound gradually lowers and braking sound starts to be heard. |

FIG. 5

| MODEL | $c$ | MEAN | STANDARD DEVIATION |
|---|---|---|---|
| SCG | | 38.0 | 21.2 |
| CSCG | 20 | 21.7 | 2.4 |
| | 50 | 57.7 | 5.0 |
| | 80 | 90.5 | 9.5 |
| | 110 | 107.2 | 20.6 |

FIG. 6

SOUND SIGNAL DATABASE GENERATION APPARATUS, SOUND SIGNAL SEARCH APPARATUS, SOUND SIGNAL DATABASE GENERATION METHOD, SOUND SIGNAL SEARCH METHOD, DATABASE GENERATION APPARATUS, DATA SEARCH APPARATUS, DATABASE GENERATION METHOD, DATA SEARCH METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/015794, filed on 8 Apr. 2020, which application claims priority to and the benefit of JP Application No. 2019-097311, filed on 24 May 2019, the disclosures of which are hereby incorporated herein by reference in their entireties.

TECHNICAL FIELD

The present invention relates to techniques for searching for sound signals.

BACKGROUND ART

As an increasingly enormous amount of sound signals has been accumulated in recent years, there is an increased demand for techniques to search for an intended sound signal in an efficient manner (hereinafter referred to as sound signal search techniques). For example, when one is to convey sound information to another person, selecting a similar sound from a sound signal database and using it for description enable efficient conveyance of information in a variety of scenes, such as facility maintenance/inspection, security, and help desk services. Also, selecting an appropriate sound effect from a sound effect database plays an important role in production of video, games, music, and the like.

Approaches to sound signal search techniques include search approaches that use a sound signal as a query and search approaches that use text data as a query. The latter search approaches using text data as a query perform a search by matching a classification tag or descriptive sentence given to a sound signal against a query. As one of such search approaches using text data, search using onomatopoeia as queries has been proposed. By using onomatopoeia that is used by people in daily life as queries, more natural human-computer interaction is achieved. Non-Patent Literature 1 proposes text-based sound signal search that is based on text similarity between an onomatopoeia tag assigned to a sound signal beforehand and an onomatopoeia query, as a search that uses onomatopoeia as queries, for example.

PRIOR ART LITERATURE

Non-Patent Literature

Non-Patent Literature 1: Kahori Okamoto, Ryosuke Yamanishi, and Mitsunori Matsushita, "Sound-effects Exploratory Retrieval System Based on Various Aspects (SERVA): Development of SERVA and User Observation", DEIM Forum 2016, E3-6, 2016.

SUMMARY OF THE INVENTION

Problems to be Solved by the Invention

However, text-based sound signal search that uses onomatopoeia as queries has the following problem.

(Problem) It is necessary to assign onomatopoeia tags to all the sound signals in a database that is to be searched. Manual assignment of onomatopoeic words involves enormous human resource cost for searching a large-scaled database. Tagging with automated onomatopoeia assignment cannot always give a sufficient number of onomatopoeia tags while maintaining sufficient accuracy.

While the discussion above is for text-based sound signal search that uses onomatopoeia as queries, the foregoing problem is also true more generally for text-based sound signal search where a sound signal is tagged with text describing features of the sound signal. That is to say, it is difficult to accurately and efficiently generate a pair of a sound signal and a sentence describing features of the sound signal for inclusion into records of a database to be used in text-based sound signal search.

An object of the present invention is accordingly to provide database generation techniques that can accurately and efficiently generate a database useable in text-based sound signal search.

Means to Solve the Problems

An aspect of the present invention includes: a latent variable generation unit that generates, from a sound signal, a latent variable corresponding to the sound signal using a sound signal encoder; a data generation unit that generates a natural language representation corresponding to the sound signal from the latent variable and a condition concerning an index for a natural language representation using a natural language representation decoder; and a sound signal database generation unit that generates a record including the natural language representation corresponding to the sound signal and the sound signal from the natural language representation corresponding to the sound signal and the sound signal, and generates a sound signal database made up of the record.

Effects of the Invention

The present invention enables accurate and efficient generation of a database useable in text-based sound signal search.

BRIEF DESCRIPTION OF THE DRAWINGS

FIG. 5 shows experiment results.
FIG. 6 shows experiment results.

DETAILED DESCRIPTION OF THE EMBODIMENTS

Figure 1:
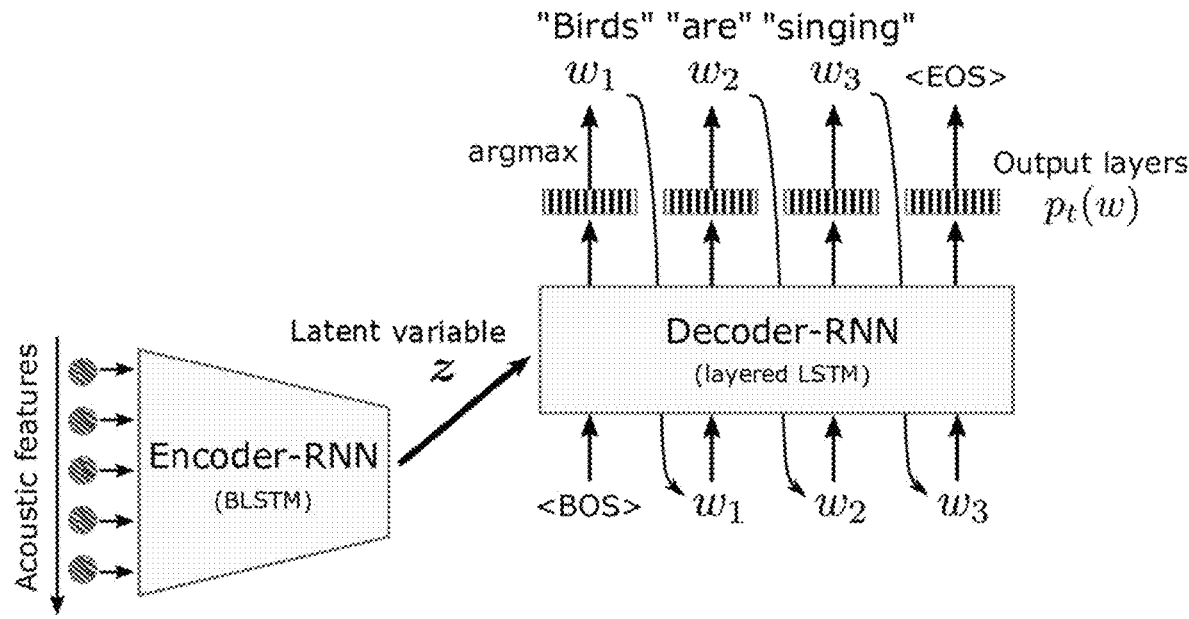
FIG. 1 illustrates an SCG.

Embodiments of the present invention are now described in detail. Components with the same functions are denoted with the same reference characters and overlapping descriptions are not repeated.

Prior to describing the embodiments, denotations used herein are described.

A "^" (caret) represents a superscript. For example, $x^{y^{\wedge}z}$ means that $y^z$ is a superscript to x and $x_{y \wedge z}$ means that $y^z$ is a subscript to x. A "_" (underscore) represents a subscript. For example, $x^{y\_z}$ means that $y_z$ is a superscript to x and $x_{y\_z}$ means that $y_z$ is a subscript to x.

Although superscripts "^" and "~" like ^x or ~x for a certain letter x are supposed to be indicated right above "x", they are indicated as ^x and ~x due to limitations of text notation in a specification.

<Technical Background>

Embodiments of the present invention use a sentence generation model when generating a sentence corresponding to a sound signal from the sound signal. A sentence generation model herein refers to a function that takes a sound signal as input and outputs a corresponding sentence. A sentence corresponding to a sound signal refers to a sentence that describes what kind of sound the sound signal represents (a descriptive sentence for the sound signal), for example.

First, as an example of the sentence generation model, a model called sequence-to-sequence caption generator (SCG) is shown.

«SCG»

The SCG is an encoder-decoder model that employs the recurrent language model (RLM) described in Reference Non-Patent Literature 1 as decoder, as shown in FIG. 1.

(Reference Non-Patent Literature 1: T. Mikolov, M. Karafiat, L. Burget, J. Cernock'y, and S. Khudanpur, "Recurrent neural network based language model", In INTERSPEECH 2010, pp. 1045-1048, 2010.)

The SCG is described with reference to FIG. 1. The SCG generates, from an input sound signal, a sentence corresponding to the sound signal through the following steps and outputs it. Instead of a sound signal, acoustic features extracted from the sound signal, for example, a sequence of Mel-frequency cepstrum coefficients (MFCC), may be used, for example. A sentence as text data is a sequence of words.

(1) The SCG extracts a latent variable z, which is a distributed representation of sound, from the sound signal via an encoder. The latent variable z is represented as a vector of predetermined dimensions (for example, 128 dimensions). The latent variable z can be said to be a summarized feature of the sound signal containing sufficient information for sentence generation. Accordingly, the latent variable z can also be said to be a fixed-length vector having both the features of the sound signal and those of the sentence.

(2) The SCG generates a sentence by sequentially outputting word $w_t$ at time t (t=1, 2, ... ) from the latent variable z via the decoder. An output layer of the decoder outputs the word $w_t$ at time t based on a probability of generation $p_t(w)$ of a word at time t according to the following formula:

$$w_t = \underset{w}{\mathrm{argmax}}\, p_t(w)$$

FIG. 1 represents that word $w_1$ at time t=1 is "Birds", word $w_2$ at time t=2 is "are", and word $w_3$ at time t=3 is "singing", and the sentence "Birds are singing" is generated. <BOS> and <EOS> in FIG. 1 are a start symbol and an end symbol, respectively.

The encoder and the decoder constituting the SCG can be any kind of neural networks that can process time-series data. For example, a recurrent neural network (RNN) or a long short-term memory (LSTM) may be used. "BLSTM" and "layered LSTM" in FIG. 1 represent bi-directional LSTM and multi-layered LSTM, respectively.

The SCG is learned through supervised learning that uses pairs of sound signals and sentences corresponding to those sound signals (these sentences are referred to as teaching data) as supervised learning data. The SCG is learned by error backpropagation with an error function $L_{SCG}$, which is a total sum of cross entropies of the word output by the decoder at time t and the word at time t contained in a sentence as teaching data.

Sentences as output by the SCG resulting from such learning have variations in detailedness of their descriptions. This is due to the following reason. For one sound signal, there is more than one correct sentences. In other words, for one sound signal, there can be a number of "correct sentences" varying in detailedness of description. For example, for one sound signal, there can be multiple correct sentences that describe what the sound signal is like, such as "a low sound is produced", "a musical instrument is being played for a while", and "a stringed instrument starts to be played at low pitch and then the volume lowers slowly", and which one of these sentences is preferable depends on the scene. For example, in some scenes a brief description is desired, while in other scenes a detailed description is desired. Thus, if learning of the SCG is performed without discriminating sentences that are different in detailedness of description, the SCG would be unable to control trends in sentences to be generated.

«Specificity»

To resolve the problem of variations outlined above, specificity to serve as an index indicating the degree of detailedness of a sentence is defined. Specificity $I_s$ of a sentence s which is a sequence of n words $[w_1, w_2, \ldots, w_n]$ is defined by the following formula:

$$I_s = \sum_{t=1}^{n} I_{w_t}$$

Here, $I_{w\_t}$ is an information content of the word $w_t$, which is determined based on a probability of appearance $p_{w\_t}$ of the word $w_t$. For example, it may be $I_{w\_t} = -\log(p_{w\_t})$. The probability of appearance $p_{w\_t}$ of the word $w_t$ can be determined using a descriptive sentence database, for example. A descriptive sentence database is a database that stores one or more sentences describing each one of multiple sound signals, and the probability of appearance of a word can be determined by determining the frequency of appearance of each word contained in sentences included in the descriptive sentence database and dividing the frequency of appearance of that word by the sum of the frequencies of appearance of all the words.

Figure 2:
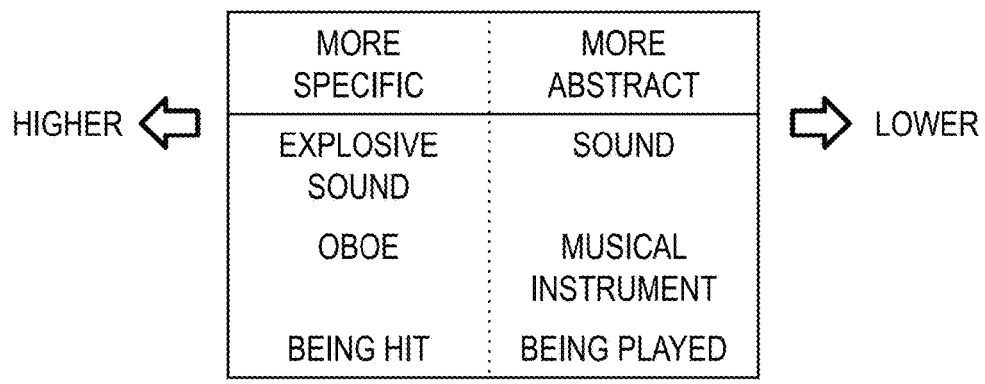
FIG. 2 illustrates specificity of a sentence.

Specificity defined in this manner has the following characteristics:

(1) Specificity is higher with a sentence that uses a word representing a specific object or action (see FIG. 2).

This is because such a word has a lower frequency of appearance and has higher information content.

Figures 3, 4:
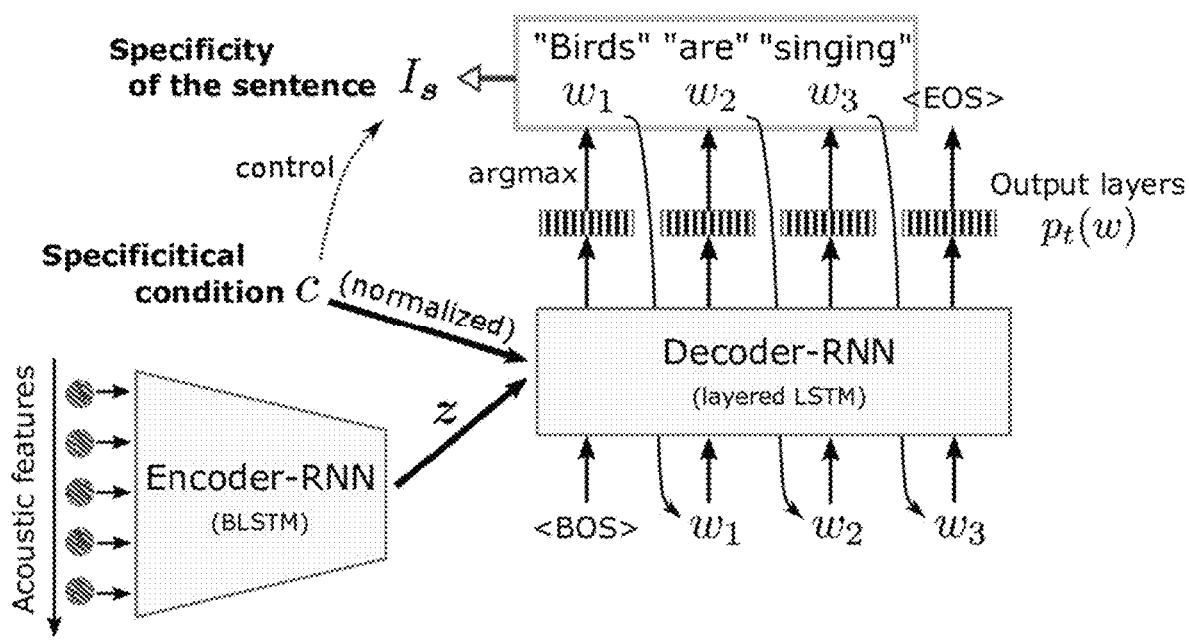
FIG. 3 illustrates specificity of a sentence.
FIG. 4 illustrates a CSCG.

(2) Specificity is higher with a sentence that uses a larger number of words (see FIG. 3).

An optimal value of specificity differs depending on the nature of a sound of interest or application. For example, when a sound should be depicted more specifically, the specificity of a sentence is preferably higher; whereas when a brief description is desired, the specificity of a sentence is preferably lower. As another problem, a sentence of high specificity tends to be inaccurate. Accordingly, it is important to be able to generate a sentence corresponding to a sound signal while freely controlling the specificity in accordance with granularity of information required for the description of the sound signal. As one model that enables such sentence generation, conditional sequence-to-sequence caption generator (CSCG) is described.

«CSCG»

As with the SCG, the CSCG is an encoder-decoder model that uses the RLM as decoder. However, the CSCG controls the specificity of the sentence to be generated by conditioning the decoder (see FIG. 4). The conditioning is made by giving a condition concerning the specificity of the sentence (specificitical condition) as an input to the decoder. Here, a condition concerning the specificity of the sentence is designation of a condition concerning the specificity of the sentence to be generated.

Referring to FIG. 4, the CSCG is described. The CSCG generates a sentence corresponding to an input sound signal from the sound signal and from a condition concerning the specificity of the sentence through the following steps and outputs it.

(1) The CSCG extracts the latent variable z, which is a distributed representation of sound, from the sound signal via the encoder.

(2) The CSCG generates a sentence by sequentially outputting the word at time t (t=1, 2, . . . ) from the latent variable z and a condition C on the specificity of the sentence via the decoder. The generated sentence will be a sentence that has specificity close to the condition C concerning the specificity of the sentence. FIG. 4 shows that the specificity $I_s$ of the generated sentence s="Birds are singing" is close to the condition C concerning the specificity of the sentence.

The CSCG can be learned through supervised learning using learning data that are pairs of sound signals and sentences corresponding to those sound signals (hereinafter referred to as first learning data) (hereinafter referred to as first learning). The CSCG can also be learned through the first learning using the first learning data and supervised learning using learning data that are pairs of specificities of sentences and sentences corresponding to the specificities (hereinafter referred to as second learning data) (hereinafter referred to as second learning). In this case, the CSCG is learned by alternately executing the first learning and the second learning each for one epoch, for example. The CSCG is also learned by executing the first learning and the second learning such that the two types of learning are mixed in a certain manner, for example. In doing so, the number of times the first learning is executed and the number of times the second learning is executed may be different values.

(1) The First Learning

Sentences corresponding to sound signals (that is, sentences as elements of teaching data) for use are manually provided ones. In the first learning, the specificity of a sentence corresponding to a sound signal is determined and included into the teaching data. The first learning performs learning so as to achieve minimization of $L_{SCG}$, which is an error between a generated sentence and a sentence as teaching data, and minimization of $L_{sp}$, which is an error related to specificity, at the same time. An error function $L_{CSCG}$ can be one that is defined with the two errors, $L_{SCG}$ and $L_{sp}$. For example, the error function $L_{CSCG}$ can be a linear sum of the two errors like the following formula:

$$L_{CSCG} = L_{SCG} + \lambda L_{sp}$$

Here, $\lambda$ is a predetermined constant.

Specific definition of the error $L_{sp}$ is discussed later.

(2) The Second Learning

When the number of the first learning data is low, learning the CSCG only with the first learning can make the CSCG excessively adapted to sound signals that are elements of the first learning data and specificity can less likely be reflected appropriately. Thus, in addition to the first learning with the first learning data, the decoder constituting the CSCG is learned through the second learning with the second learning data.

In the second learning, the decoder being learned is used to generate a sentence corresponding to a specificity c which is an element of the second learning data, and the decoder is learned so as to minimize the error $L_{sp}$ using a sentence that is an element of the second learning data as teaching data for the generated sentence. The specificity c as an element of the second learning data may be one generated in a predetermined manner such as by random number generation. A sentence as an element of the second learning data is a sentence having specificity close to the specificity c (that is, with a difference from the specificity c being smaller than a predetermined threshold or equal to or smaller than a predetermined threshold).

Specifically, normalization is applied using $L_{SCG}$, which is an error between a generated sentence and a sentence having specificity close to c.

$$L_{CSCG} = \lambda' S_{CG} + \lambda L_{sp}$$

Here, $\lambda'$ is a constant satisfying $\lambda' < 1$.

By executing the second learning in addition to the first learning, generalization performance of the CSCG can be improved.

The error $L_{sp}$ can also be defined as the difference between the specificity of a generated sentence and the specificity of the sentence as teaching data in the case of the first learning, and as the difference between the specificity of a generated sentence and the specificity given as teaching data in the case of the second learning. However, when the error $L_{sp}$ is defined in this manner, an error cannot be back-propagated because discretization into one word is performed at a point when the output at time t is obtained. Accordingly, in order to enable learning by error backpropagation, it is effective to use an estimated value of the specificity of a generated sentence instead of the specificity. For example, an estimated specificity $\hat{I}_s$ of a generated sentence s can be one defined by the following formulas:

$$\hat{I}_s = \sum_t E(I_{w_{t,j}})$$

$$E(I_{w_{t,j}}) = \sum_j I_{w_{t,j}} p(w_{t,j}).$$

Here, the value $p(w_{t,j})$ of unit j of the output layer of the decoder at time t is the probability of generation of word $w_{t,j}$ corresponding to the unit j, and $I_{w\_t,j}$ is the information content of the word $w_{t,j}$, which is determined based on the probability of generation $p_{w\_t,j}$ of the word $w_{t,j}$.

Then, the error $L_{sp}$ is defined as the difference between the estimated specificity $\hat{I}_s$ and the specificity of the sentence as teaching data in the case of the first learning, and as the difference between the estimated specificity $\hat{I}_s$ and the specificity given as the teaching data in the case of the second learning.

Experiment

In this section, results of an experiment for verifying the effect of sentence generation with the CSCG are explained. The experiment was conducted for the two purposes:

(1) Verifying controllability with specificity; and
(2) Evaluating the quality of generated sentences by subjective evaluation concerning acceptability.

First, data used in the experiment is described. From sound signals (within 6 seconds) that were acquired by recording sound events such as musical instrument sound and voice, 392 sound sources with descriptive sentences (supervised learning data) and 579 sound sources without descriptive sentences (unsupervised learning data) were generated. In generating the sound sources with descriptive sentences, one to four descriptive sentences were given to each sound source. The total number of descriptive sentences given is 1113. These descriptive sentences were generated by asking subjects to listen to each sound source and write a sentence describing what kind of sound it is. Further, by making partial deletion and replacement to the 1113 descriptive sentences, they were increased to 21726 descriptive sentences and the 21726 descriptive sentences were used to build a descriptive sentence database.

The experiment results are now explained. The experiment results were evaluated in the form of comparison between the SCG and the CSCG. In the experiment, sentences were generated using a learned SCG and a learned CSCG.

Experiment results related to the purpose (1) are described first. FIG. 5 is a table showing what kinds of sentences were generated by the SCG and the CSCG for certain sound sources. For example, it shows that for a sound source of snapping fingers, the sentence "a light sound is produced only momentarily" (a generated caption) was generated by the SCG and the sentence "fingers are snapped" was generated by the CSCG with a specificity of 20. FIG. 6 is a table showing the means and standard deviations of specificity for the respective models. These statistics were calculated from the results of generating sentences with 29 sound sources as test data. From the table of FIG. 6, the followings can be seen in relation to specificity:

(1) The SCG has a very large standard deviation in specificity.
(2) The CSCG generated sentences having specificity responsive to the value of the input specificity c and has a small standard deviation compared that of the SCG. However, the standard deviation becomes larger as the input specificity c is higher. This is probably because variations become larger due to absence of a descriptive sentence that fits sound while having specificity close to the input specificity c.

It can be seen that the CSCG is able to reduce variations in the specificity of generated sentences and generate sentences appropriate for the specificity.

Experiment results related to the purpose (2) are described next. First, whether sentences generated with the SCG could be subjectively accepted was evaluated on a scale of four levels. Then, sentences generated with the SCG and sentences generated with the CSCG were compared and evaluated.

Figure 7:
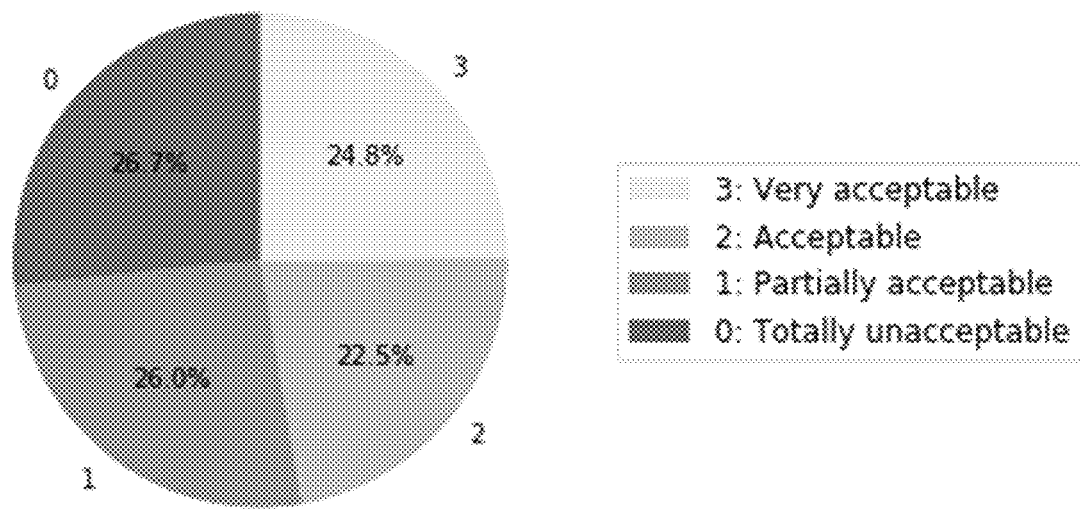
FIG. 7 shows experiment results.

The four-level evaluation used 29 sound sources as test data and adopted a form where 41 subjects answered for all the test data. FIG. 7 shows the results. The mean value was 1.45 and the variance was 1.28. This shows that sentences generated with the SCG acquired evaluations higher than "partially acceptable" on average.

Figure 8:
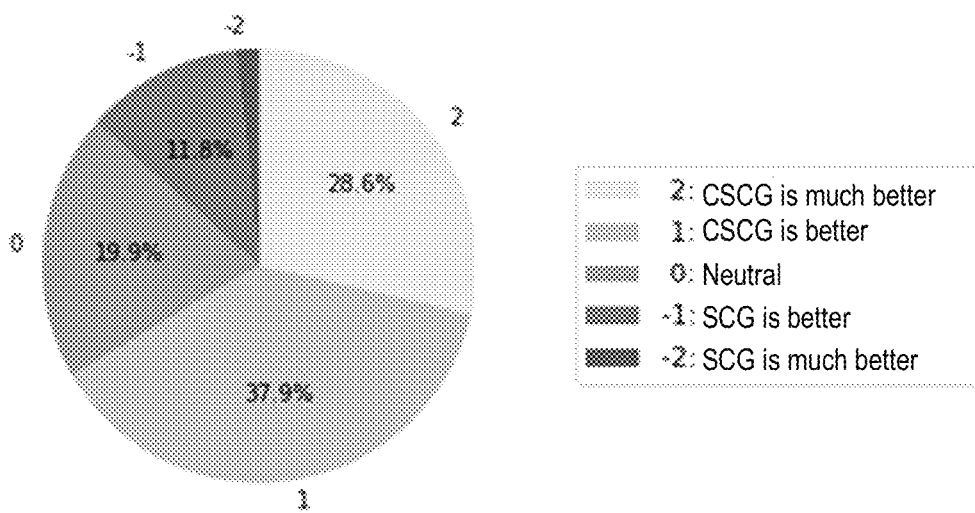
FIG. 8 shows experiment results.

In the comparison and evaluation, sentences generated with the CSCG under the four conditions of c=20, 50, 80, 100 and sentences generated with the SCG were compared and evaluated and answers that gave the highest evaluation to the CSCG among the four levels of comparison and evaluation were selected and aggregated. FIG. 8 shows the result. The result is for the answers of 19 subjects with 100 sound sources as test data, where the CSCG acquired an evaluation significantly higher than that for the SCG with a significance level of 1%. The mean value was 0.80 and the variance was 1.07.

«Variations of Specificity»

Specificity is an auxiliary input for controlling the nature (specifically, information content) of a sentence to be generated. The specificity may be a single numerical value (a scalar value) or a set of numerical values (a vector) as long as it can control the nature of a sentence to be generated. The followings are several examples of the same.

(Example 1) an Approach Based on the Frequency of Appearance of a Word N-Gram, which is a Sequence of N Words This approach uses the frequency of appearance of a sequence of words instead of the frequency of appearance of a single word. This approach may be able to control the nature of a sentence to be generated more appropriately because it can take an order of words into consideration. As with the probability of appearance of a word, the probability of appearance of a word N-gram can be calculated using a descriptive sentence database. Instead of a descriptive sentence database, any other available corpus may be used.

(Example 2) an Approach Based on the Number of Words

This approach uses the number of words contained in a sentence as specificity. Instead of the number of words, the number of characters may be used.

(Example 3) an Approach Using a Vector

For example, a three-dimensional vector with a set of the probability of appearance of a word, the probability of appearance of a word N-gram, and the number of words described above may be used as specificity. It is also possible to set categories (topics) for classification of words, such as politics, economics, and science, allocate a dimension to each category, and define specificity with a set of the probability of appearance of words in the respective categories as a vector. This would enable reflection of wordings that are specific to each category.

«Application»

The framework of learning of the SCG/CSCG and sentence generation with the SCG/CSCG can also be applied to more complicated sound like music or even media other than sound, aside from relatively simple sounds such as the sound sources illustrated in FIG. 5. Media other than sound can include images such as pictures, illustrations, or clip arts, and moving images. They may also be industrial designs or gustatory sense.

As with the SCG/CSCG, a model for associating such data with sentences corresponding to the data can be learned and the model can be used to generate a sentence. For example, for gustatory sense, it will be possible to generate a sentence as description/review about wine or agricultural produce by using a signal from a gustatory sensor as input. In that case, signals from an olfactory sensor, a tactile sensor, and a camera may be input together in addition to the gustatory sensor.

For handling of non-time-series data, the encoder and the decoder may be built with neural networks such as a convolutional neural network (CNN), for example.

First Embodiment

«Data Generation Model Learning Apparatus 100»

Figure 9:
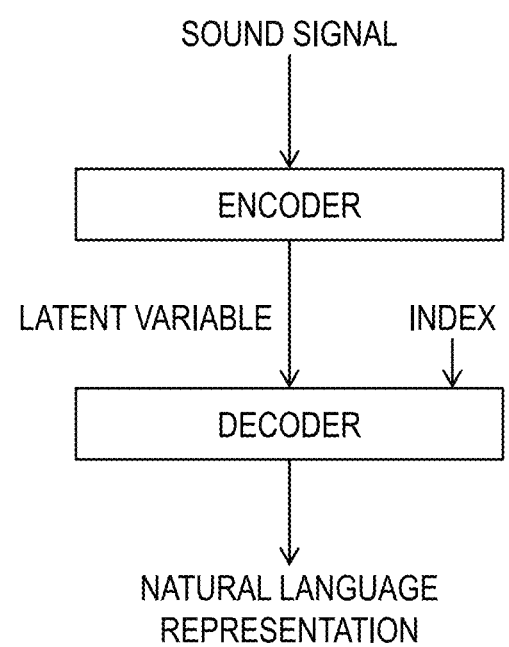
FIG. 9 shows an overview of a data generation model.

A data generation model learning apparatus 100 performs learning of a data generation model using learning data. The learning data includes the first learning data, which is pairs of sound signals and natural language representations corresponding to the sound signals, and the second learning data, which is pairs of indices for natural language representations and natural language representations corresponding to the indices. The data generation model refers to a function that takes as input a sound signal and a condition concerning an index for a natural language representation (for example, the specificity of a sentence) and generates and outputs a natural language representation corresponding to the sound signal. The data generation model is constructed as a pair of an encoder for generating, from a sound signal, a latent variable corresponding to the sound signal and a decoder for generating a natural language representation corresponding to the sound signal from the latent variable and the condition concerning an index for the natural language representation (see FIG. 9). A condition concerning an index for a natural language representation means an index required for the natural language representation to be generated, and the required index may be designated with a single numerical value or with a range. The encoder and the decoder can be any kind of neural networks that can process time-series data. Examples of natural language representations include phrases made up of two or more words without a subject and a predicate and onomatopoeia, aside from sentences as described in <Technical background>.

Figure 10:
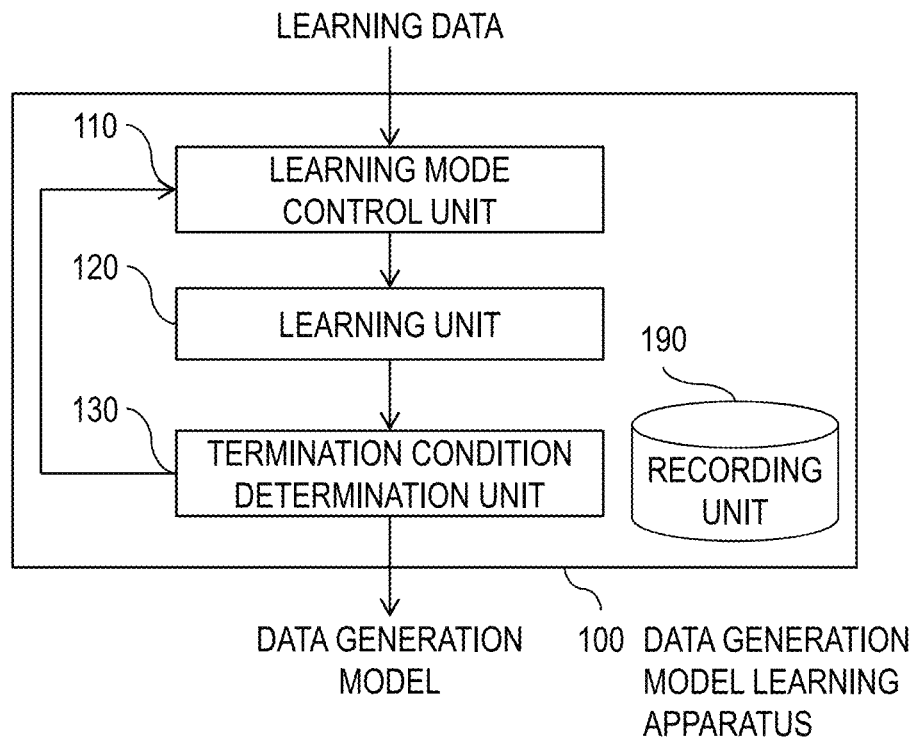
FIG. 10 is a block diagram showing a configuration of a data generation model learning apparatus 100.
Figure 11:
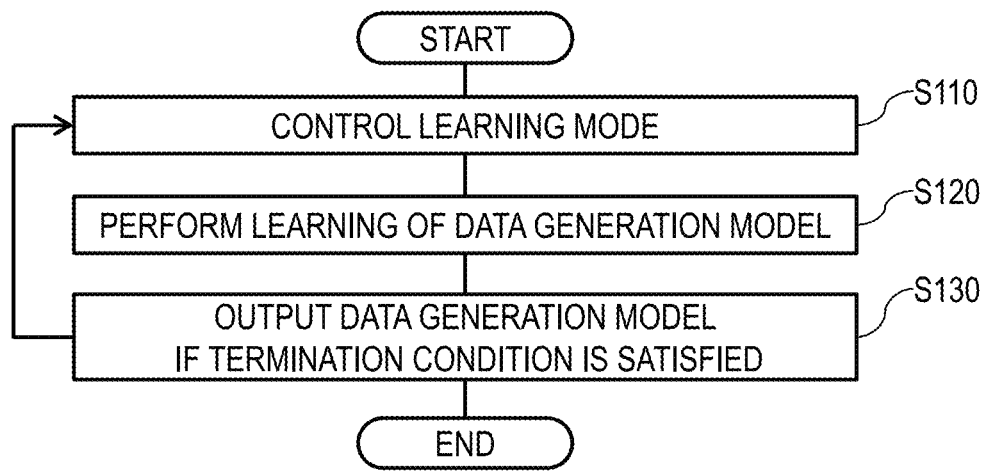
FIG. 11 is a flowchart illustrating operations of the data generation model learning apparatus 100.

Now referring to FIGS. 10 and 11, the data generation model learning apparatus 100 is described. FIG. 10 is a block diagram showing a configuration of the data generation model learning apparatus 100. FIG. 11 is a flowchart illustrating operations of the data generation model learning apparatus 100. As shown in FIG. 10, the data generation model learning apparatus 100 includes a learning mode control unit 110, a learning unit 120, a termination condition determination unit 130, and a recording unit 190. The recording unit 190 is a component that records information necessary for processing by the data generation model learning apparatus 100 as desired. The recording unit 190 records learning data therein before learning is started, for example.

In accordance with FIG. 11, operation of the data generation model learning apparatus 100 is described. The data generation model learning apparatus 100 takes as input the first learning data, an index for a natural language representation as an element of the first learning data, and the second learning data, and outputs a data generation model. An index for a natural language representation as an element of the first learning data may also be determined by the learning unit 120 from a natural language representation as an element of the first learning data, instead of being input.

In S110, the learning mode control unit 110 takes as input the first learning data, an index for a natural language representation as an element of the first learning data, and the second learning data, and generates and outputs a control signal for controlling the learning unit 120. Here, the control signal is a signal to control learning mode so that either of the first learning and the second learning is executed. The control signal can be a signal to control the learning mode so that the first learning and the second learning are alternately executed, for example. The control signal can also be a signal to control the learning mode so as to execute the first learning and the second learning such that the two types of learning are mixed in a certain manner, for example. In that case, the number of times the first learning is executed and the number of times the second learning is executed may be different values.

In S120, the learning unit 120 takes as input the first learning data, an index for a natural language representation as an element of the first learning data, the second learning data, and the control signal that was output in S110. When the learning designated by the control signal is the first learning, the learning unit 120 uses the first learning data and the index for a natural language representation as an element of the first learning data to perform learning of an encoder for generating a latent variable corresponding to a sound signal from the sound signal and a decoder for generating a natural language representation corresponding to the sound signal from the latent variable and a condition concerning an index for a natural language representation. When the learning designated by the control signal is the second learning, the learning unit 120 uses the second learning data to perform learning of the decoder. And the learning unit 120 outputs a data generation model which is a pair of the encoder and the decoder, with information necessary for the termination condition determination unit 130 to make a determination on a termination condition (for example, the number of times learning has been performed). The learning unit 120 executes learning in units of epoch regardless of whether the learning being executed is the first learning or the second learning. The learning unit 120 also performs learning of the data generation model by error backpropagation with the error function $L_{CSCG}$. The error function $L_{CSCG}$ is defined by the formula below when the learning to be executed is the first learning, where λ is a predetermined constant.

$$L_{CSCG}=L_{SCG}+\lambda L_{sp}$$

When the learning to be executed is the second learning, it is defined by the formula below, where λ' is a constant that satisfies λ'<1.

$$L_{CSCG}=\lambda'L_{SCG}+\lambda_{sp}$$

Here, the error $L_{SCG}$ related to a natural language representation is, when the learning to be executed is the first learning, a cross-entropy calculated from a natural language representation which is the output of the data generation model for a sound signal as an element of the first learning data and a natural language representation as an element of the first learning data, and is, when the learning to be executed is the second learning, a cross-entropy calculated from a natural language representation which is the output of the decoder for the index as an element of the second learning data and a natural language representation as an element of the second learning data.

The error function $L_{CSCG}$ may be any function that is defined with the two errors, $L_{SCG}$ and $L_{sp}$.

When a natural language representation is a sentence, the specificity of the sentence can be used as an index for a natural language representation as discussed in <Technical background>. In this case, the specificity of the sentence is defined with at least one of the probability of appearance of a word or the probability of appearance of a word N-gram that is contained in the sentence defined using at least a predetermined word database, the number of words contained in the sentence, and the number of characters contained in the sentence. For example, the specificity of a sentence may be defined by the formula below, where $I_s$ is the specificity of a sentence s which is a sequence of n words $[w_1, w_2, \ldots, w_n]$.

$$I_s = \sum_{t=1}^{n} I_{w_t}$$

(Here, $I_{w\_t}$ is the information content of the word $w_t$, which is determined based on the probability of appearance $p_{w\_t}$ of the word $w_t$.)

The specificity $I_s$ may be anything that is defined with the information content $I_{w\_t}$ (1≤t≤n).

The word database can be any kind of database that allows definition of the probability of appearance of a word contained in sentences or the probability of appearance of a word N-gram contained in sentences. The word database can be the descriptive sentence database described in <Technical background>, for example.

The estimated specificity $\hat{I}_s$ of the sentence s as the output of the decoder is defined as:

$$\hat{I}_s = \sum_t E(I_{w_{t,j}})$$

$$E(I_{w_{t,j}}) = \sum_j I_{w_{t,j}} p(w_{t,j})$$

(where, the value $p(w_{t,j})$ of the unit j of the output layer of the decoder at time t is the probability of generation of the word $w_{t,j}$ corresponding to the unit j, and $I_{w\_t,j}$ is the information content of the word $w_{t,j}$, which is determined based on the probability of generation $p_{w\_t,j}$ of the word $w_{t,j}$), and the error $L_{sp}$ related to the specificity of the sentence is, when the learning to be executed is the first learning, the difference between the estimated specificity $\hat{I}_s$ and the specificity of a sentence as an element of the first learning data, and is, when the learning to be executed is the second learning, the difference between the estimated specificity $\hat{I}_s$ and specificity as an element of the second learning data.

For a phrase, specificity can also be defined as with a sentence.

In S130, the termination condition determination unit 130 takes as input the data generation model that was output at S120 and information necessary for determining the termination condition that was output at S120 and determines whether the termination condition, which is a condition concerning termination of learning, is satisfied or not (for example, the number of times learning has been performed has reached a predetermined number of iterations). If the termination condition is satisfied, the termination condition determination unit 130 outputs the data generation model and ends the processing. On the other hand, if the termination condition is not satisfied, it returns to the processing of S110.

«Data Generation Model Learning Apparatus 150»

A data generation model learning apparatus 150 performs learning of a data generation model using learning data. The data generation model learning apparatus 150 is different from the data generation model learning apparatus 100 in that it executes only the first learning using the first learning data.

Figure 12:
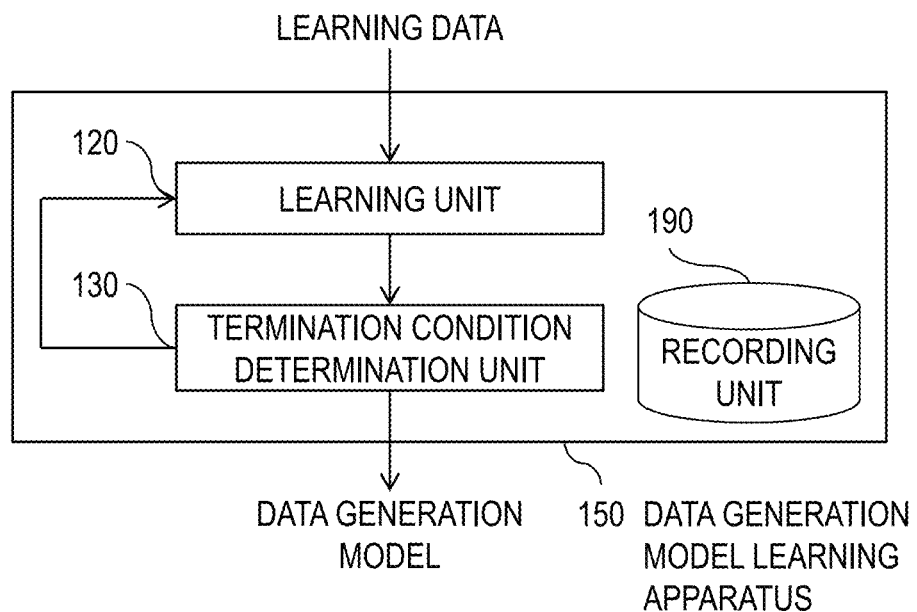
FIG. 12 is a block diagram showing a configuration of a data generation model learning apparatus 150.
Figure 13:
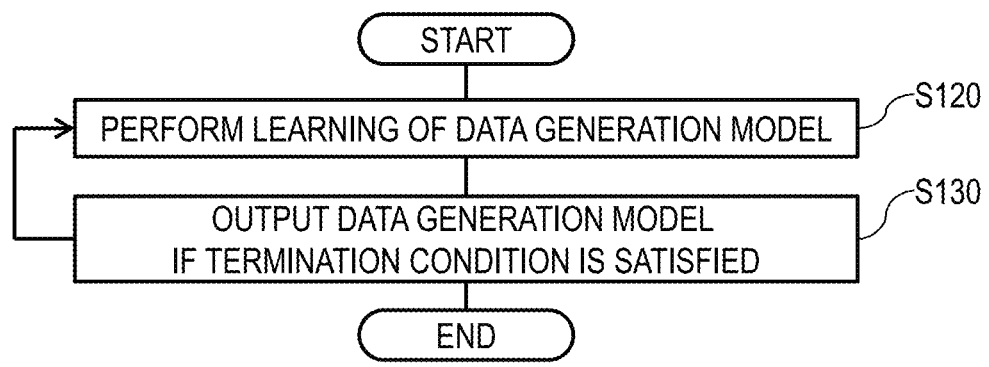
FIG. 13 is a flowchart illustrating operations of the data generation model learning apparatus 150.

Now referring to FIGS. 12 and 13, the data generation model learning apparatus 150 is described. FIG. 12 is a block diagram showing a configuration of the data generation model learning apparatus 150. FIG. 13 is a flowchart illustrating operations of the data generation model learning apparatus 150. As shown in FIG. 12, the data generation model learning apparatus 150 includes the learning unit 120, the termination condition determination unit 130, and the recording unit 190. The recording unit 190 is a component that records information necessary for processing by the data generation model learning apparatus 150 as desired.

In accordance with FIG. 13, operation of the data generation model learning apparatus 150 is described. The data generation model learning apparatus 150 takes as input the first learning data and an index for a natural language representation as an element of the first learning data, and outputs a data generation model. An index for a natural language representation as an element of the first learning data may also be determined by the learning unit 120 from a natural language representation as an element of the first learning data, instead of being input.

In S120, the learning unit 120 takes as input the first learning data and an index for a natural language representation as an element of the first learning data, performs learning of the encoder and the decoder using the first learning data and the index for a natural language representation as an element of the first learning data, and outputs the data generation model which is a pair of the encoder and the decoder, with information necessary for the termination condition determination unit 130 to make a determination on the termination condition (for example, the number of times learning has been performed). The learning unit 120 executes learning in units of epoch, for example. The learning unit 120 also performs learning of the data generation model by error backpropagation with the error function $L_{CSCG}$. The error function $L_{SCG}$ is defined by the formula below, where $\lambda$ is a predetermined constant.

$$L_{CSCG} = L_{SCG} + \lambda L_{sp}$$

The definition of the two errors $L_{SCG}$ and $L_{sp}$ is the same as that for the data generation model learning apparatus 100. The error function $L_{CSCG}$ may be any function that is defined with the two errors, $L_{SCG}$ and $L_{sp}$.

In S130, the termination condition determination unit 130 takes as input the data generation model that was output at S120 and information necessary for determining the termination condition that was output at S120 and determines whether the termination condition, which is a condition concerning termination of learning, is satisfied or not (for example, the number of times learning has been performed has reached a predetermined number of iterations). If the termination condition is satisfied, the termination condition determination unit 130 outputs the data generation model and ends the processing. On the other hand, if the termination condition is not satisfied, it returns to the processing of S120.

«Data Generation Apparatus 200»

A data generation apparatus 200 generates a natural language representation corresponding to a sound signal from the sound signal and a condition concerning an index for a natural language representation, using a data generation model learned with the data generation model learning apparatus 100 or the data generation model learning apparatus 150. A data generation model learned with the data generation model learning apparatus 100 or the data generation model learning apparatus 150 is also referred to as a learned data generation model. The encoder and the decoder constituting a learned data generation model are also referred to as a learned encoder and a learned decoder, respectively. It is of course possible to use a data generation model learned with a data generation model learning apparatus other than the data generation model learning apparatus 100 or the data generation model learning apparatus 150.

Figure 14:
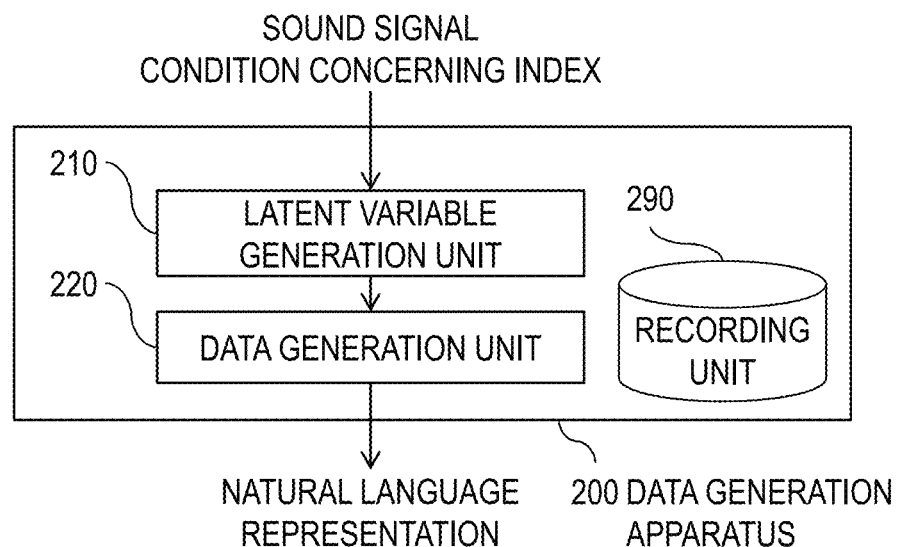
FIG. 14 is a block diagram showing a configuration of a data generation apparatus 200.
Figure 15:
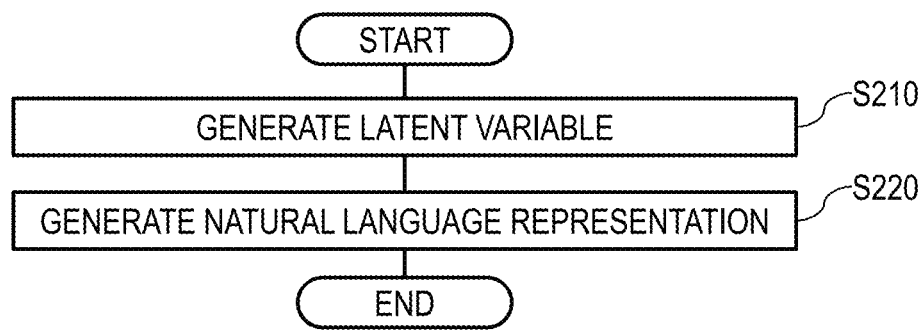
FIG. 15 is a flowchart illustrating operations of the data generation apparatus 200.

Now referring to FIGS. 14 and 15, the data generation apparatus 200 is described. FIG. 14 is a block diagram showing a configuration of the data generation apparatus 200. FIG. 15 is a flowchart illustrating operations of the data generation apparatus 200. As shown in FIG. 14, the data generation apparatus 200 includes a latent variable generation unit 210, a data generation unit 220, and a recording unit 290. The recording unit 290 is a component that records information necessary for processing by the data generation apparatus 200 as desired. The recording unit 290 records a learned data generation model (that is, a learned encoder and a learned decoder) therein beforehand, for example.

In accordance with FIG. 15, operation of the data generation apparatus 200 is described. The data generation apparatus 200 takes as input a sound signal and a condition concerning an index for a natural language representation, and outputs a natural language representation.

In S210, the latent variable generation unit 210 takes a sound signal as input, generates a latent variable corresponding to the sound signal from the sound signal using the learned encoder, and outputs it.

In S220, the data generation unit 220 takes as input the latent variable that was output in S210 and the condition concerning an index for a natural language representation, generates a natural language representation corresponding to the sound signal from the latent variable and the condition concerning an index for a natural language representation using the learned decoder, and outputs it.

This embodiment of the present invention enables learning of a data generation model for generating a natural language representation corresponding to a sound signal from the sound signal, using an index for a natural language representation as auxiliary input. This embodiment of the present invention also enables generation of a natural language representation corresponding to a sound signal from the sound signal while controlling an index for the natural language representation.

Second Embodiment

The encoder and the decoder constituting a data generation model learned with the data generation model learning apparatus 100 or the data generation model learning apparatus 150 are hereinafter referred to as a sound signal encoder and a natural language representation decoder, respectively. The sound signal encoder and the natural language representation decoder may also be referred to as a learned sound signal encoder and a learned natural language representation decoder, respectively. The data generation model may also be referred to as a natural language representation generation model.

Figure 16:
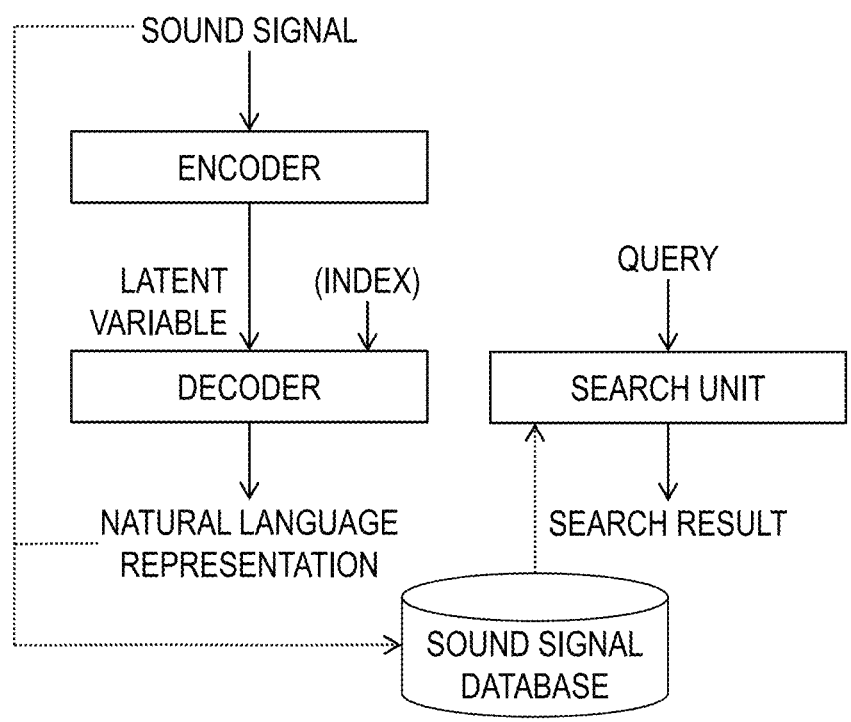
FIG. 16 shows an overview of a sound signal search process.

FIG. 16 shows an overview of a sound signal search process according to this embodiment. A sound signal search apparatus 300 uses a natural language representation as a query (inquiry).

This section first describes a sound signal database generation apparatus 250, which generates a sound signal database with a data generation model.

«Sound Signal Database Generation Apparatus 250»

The sound signal database generation apparatus 250 generates a sound signal database from (multiple) pair(s) of sound signal and a condition concerning an index for a natural language representation, using a learned data generation model.

Figure 17:
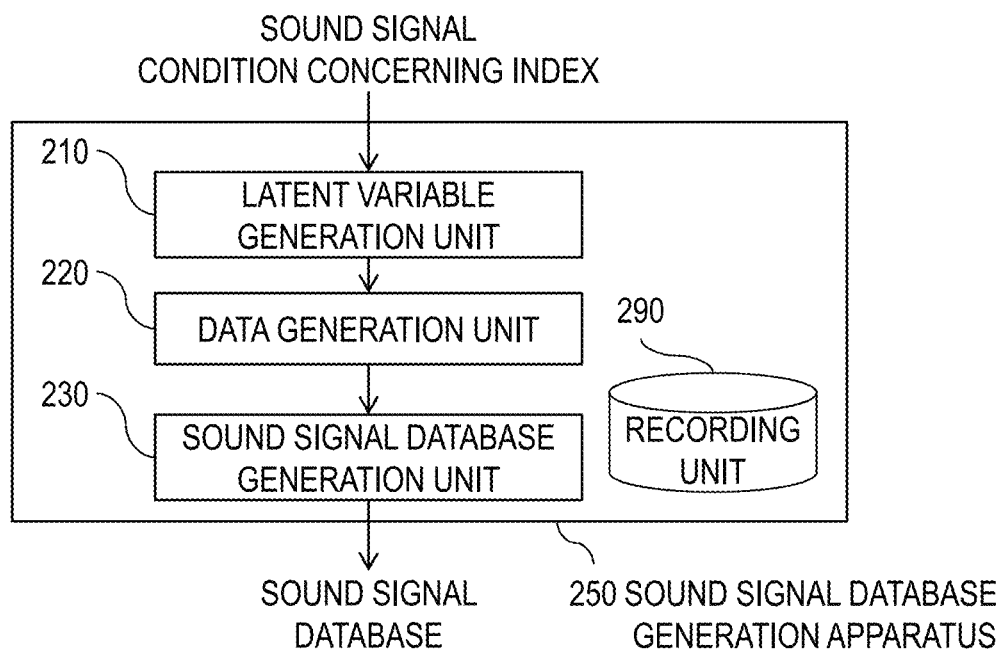
FIG. 17 is a block diagram showing a configuration of a sound signal database generation apparatus 250.
Figure 18:
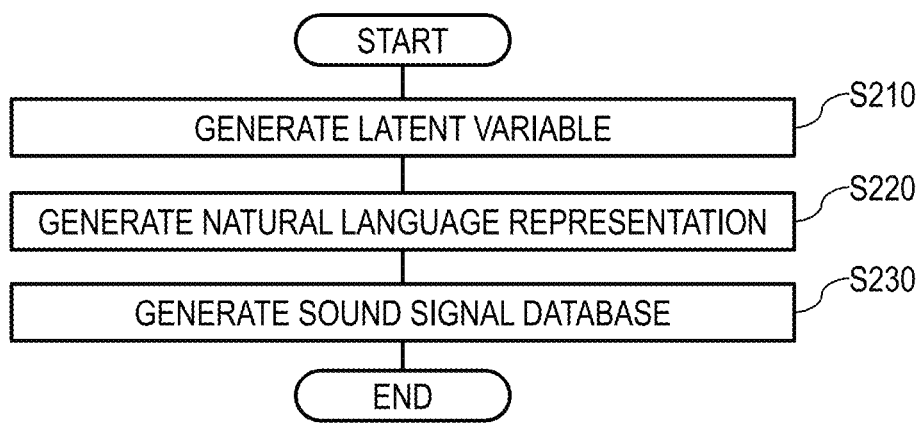
FIG. 18 is a flowchart illustrating operations of the sound signal database generation apparatus 250.

Now referring to FIGS. 17 and 18, the sound signal database generation apparatus 250 is described. FIG. 17 is a block diagram showing a configuration of the sound signal database generation apparatus 250. FIG. 18 is a flowchart illustrating operations of the sound signal database generation apparatus 250. As shown in FIG. 17, the sound signal database generation apparatus 250 includes the latent variable generation unit 210, the data generation unit 220, a sound signal database generation unit 230, and the recording unit 290. The recording unit 290 is a component that records information necessary for processing by the sound signal database generation apparatus 250 as desired. The recording unit 290 records a learned data generation model (that is, a learned sound signal encoder and a learned natural language representation decoder) therein beforehand, for example.

In accordance with FIG. 18, operation of the sound signal database generation apparatus 250 is described. The sound signal database generation apparatus 250 takes as input a pair of a sound signal and a condition concerning an index for a natural language representation and outputs a sound signal database. (Multiple) pair(s) of a sound signal and a condition concerning an index for a natural language representation for input may be recorded in a recording device outside the sound signal database generation apparatus 250 and read therefrom or may be recorded in the recording unit 290 and read therefrom.

In S210, the latent variable generation unit 210 takes a sound signal as input, generates a latent variable corresponding to the sound signal from the sound signal using the learned sound signal encoder, and outputs it.

In S220, the data generation unit 220 takes as input the latent variable that was output in S210 and a condition concerning an index for a natural language representation, generates a natural language representation corresponding to the sound signal from the latent variable and the condition concerning an index for a natural language representation using the learned natural language representation decoder, and outputs it.

In S230, the sound signal database generation unit 230 takes as input the natural language representation corresponding to the sound signal that was output in S220 and the input sound signal, generates a record including the natural language representation corresponding to the sound signal and the sound signal from the natural language representation corresponding to the sound signal and the sound signal, generates a sound signal database made up of the record, and outputs it.

A pair of a sound signal and a condition concerning an index for a natural language representation as the input may include a condition specifying different indices for one sound signal. By generating a sound signal database using such a pair, the sound signal database will be constructed to include records containing natural language representations with different indices for one signal and the sound signal itself. In other words, when the sound signal database has, for a sound signal, two or more records containing the sound signal, there are two or more kinds of indices for the natural language representations that are contained in those records.

«Sound Signal Search Apparatus 300»

A sound signal search apparatus 300 uses a sound signal database generated by the sound signal database generation apparatus 250 to search for a sound signal corresponding to a natural language representation being input (hereinafter referred to as an input natural language representation) from the input natural language representation.

Figure 19:
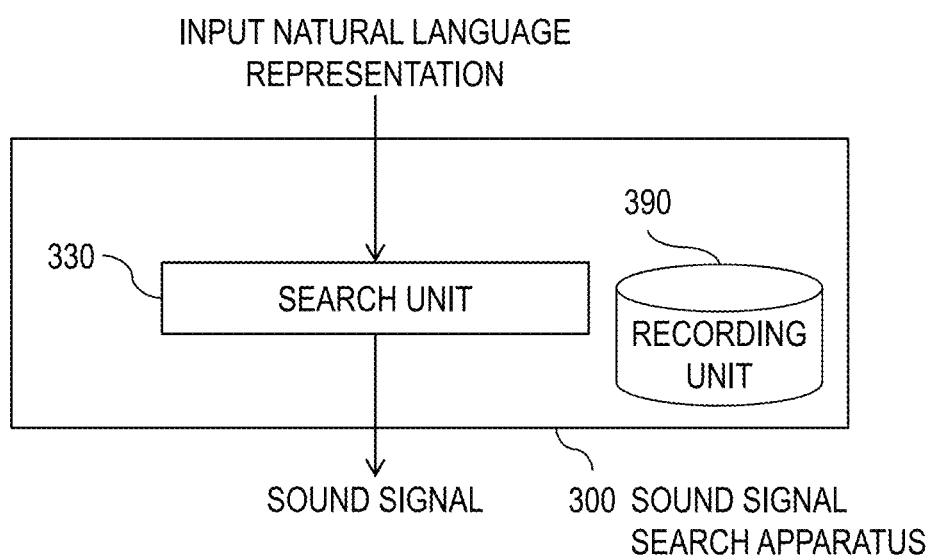
FIG. 19 is a block diagram showing a configuration of a sound signal search apparatus 300.
Figure 20:
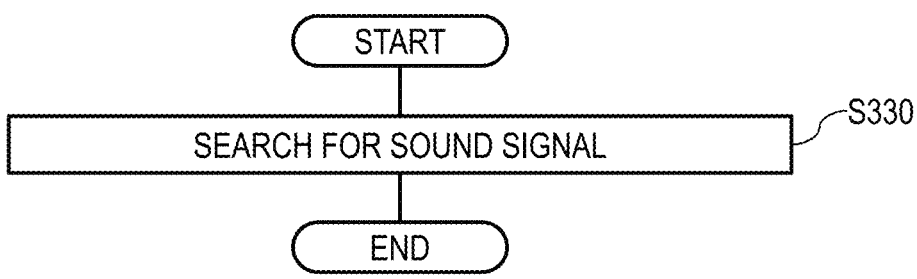
FIG. 20 is a flowchart illustrating operations of the sound signal search apparatus 300.

Referring to FIGS. 19 and 20, the sound signal search apparatus 300 is now described. FIG. 19 is a block diagram showing a configuration of the sound signal search apparatus 300. FIG. 20 is a flowchart illustrating operations of the sound signal search apparatus 300. As shown in FIG. 19, the sound signal search apparatus 300 includes a search unit 330 and a recording unit 390. The recording unit 390 is a component that records information necessary for processing by the sound signal search apparatus 300 as desired. The recording unit 390 records a sound signal database therein beforehand, for example.

In accordance with FIG. 20, operation of the sound signal search apparatus 300 is described. The sound signal search apparatus 300 takes an input natural language representation as input and outputs a sound signal corresponding to the input natural language representation.

In S330, the search unit 330 takes an input natural language representation as input, determines a sound signal corresponding to the input natural language representation as a search result from the input natural language representation using the sound signal database, and outputs it. Here, the search unit 330 determines the search result by calculating a degree of similarity between the input natural language representation and a natural language representation contained in the sound signal database. For example, the search unit 330 can determine a sound signal paired with the natural language representation contained in the sound signal database that has the highest degree of similarity with the input natural language representation as a search result. More generally, with N being an integer equal to or greater than 1, the search unit 330 can determine sound signals paired with N natural language representations contained in the sound signal database in descending order of degree of similarity with the input natural language representation as a search result. Alternatively, the search unit 330 may determine a sound signal paired with a natural language representation contained in the sound signal database that has a degree of similarity with the input natural language representation equal to or greater than a predetermined threshold or greater than a predetermined threshold as a search result. When the input natural language representation or a natural language representation contained in a sound database is represented as a sequence of words, handling it as a word vector allows use of some method for calculating the degree of similarity of a natural language representation. For example, Doc2vec, which handles meanings of a word as a vector and correspondingly performs vector computation regarding a natural language representation as an aggregate of words, cosine similarity, and the like can be used.

This embodiment of the present invention enables accurate and efficient generation of a database useable in text-based sound signal search. Specifically, it is possible to generate a sound signal database made up of records each including a natural language representation generated with a data generation model and describing the features of a sound signal and the sound signal. This embodiment of the present invention also enables a search for a sound signal corresponding to a natural language representation related to a desired sound signal with the sound signal database using the natural language representation as a query.

Third Embodiment

Figure 21:
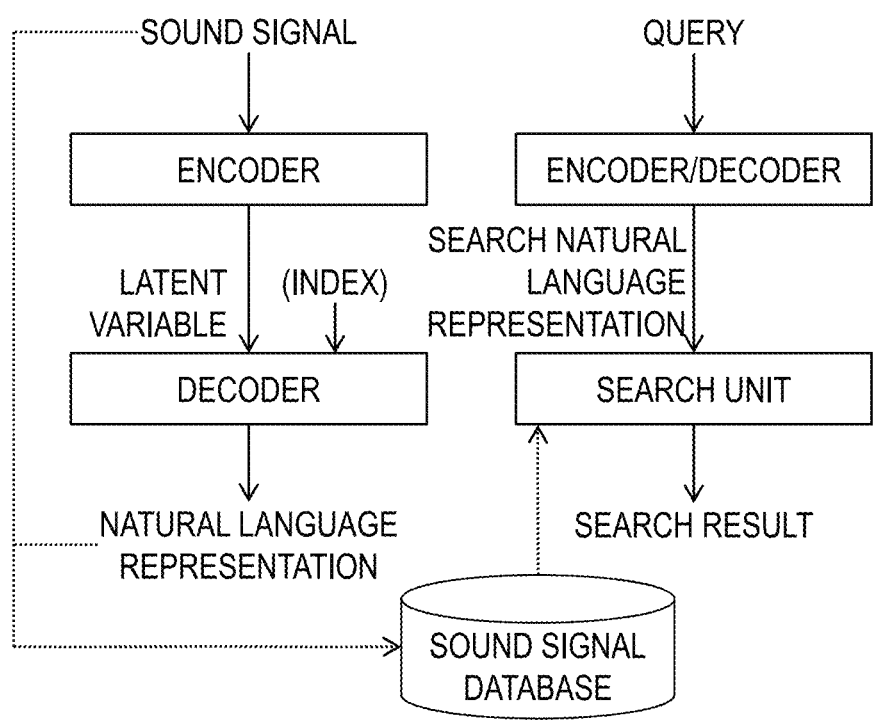
FIG. 21 shows an overview of a sound signal search process.

FIG. 21 shows an overview of a sound signal search process according to this embodiment. A sound signal search apparatus 400 uses a sound signal as a query (inquiry).

«Sound Signal Search Apparatus 400»

The sound signal search apparatus 400 uses a sound signal database generated by the sound signal database generation apparatus 250 to search for a sound signal corresponding to a sound signal being input (hereinafter referred to as an input sound signal) from the input sound signal.

Figure 22:
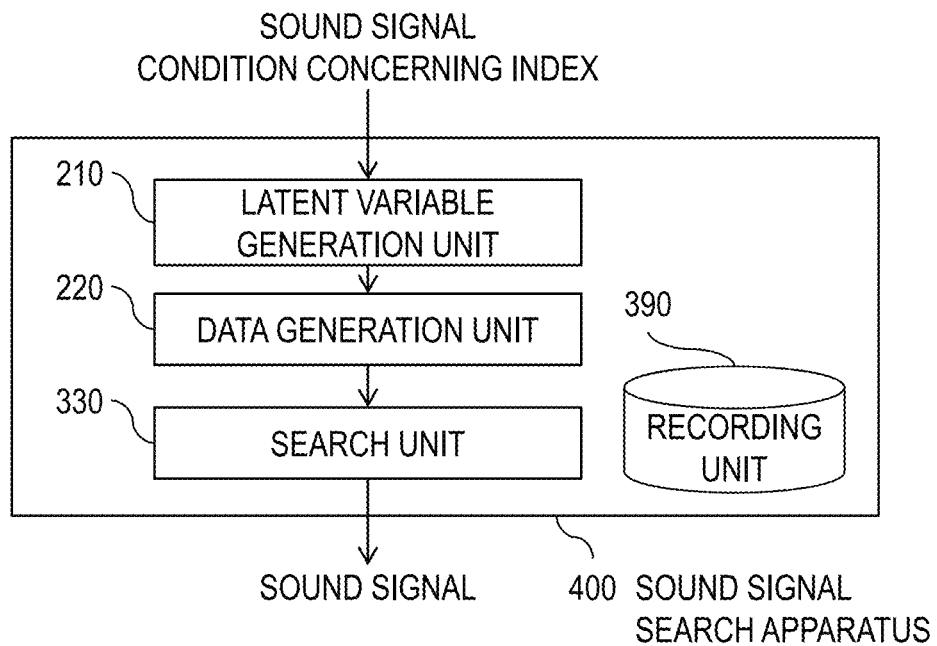
FIG. 22 is a block diagram showing a configuration of a sound signal search apparatus 400.
Figure 23:
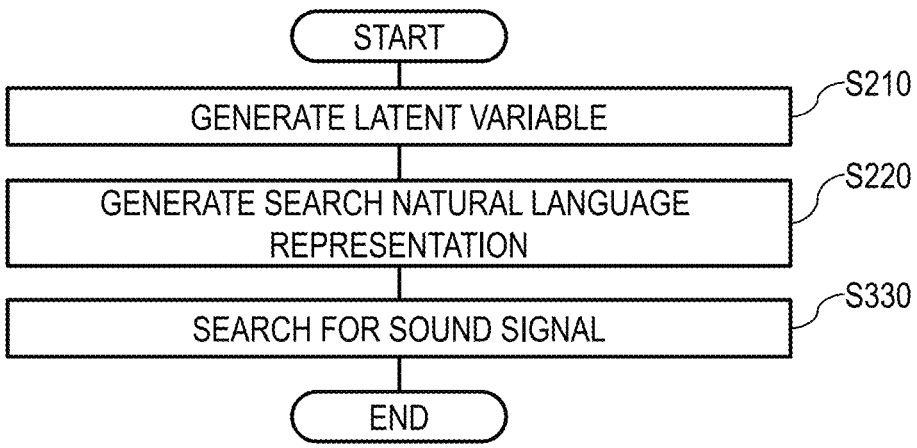
FIG. 23 is a flowchart illustrating operations of the sound signal search apparatus 400.

Referring to FIGS. 22 and 23, the sound signal search apparatus 400 is described. FIG. 22 is a block diagram showing a configuration of the sound signal search apparatus 400. FIG. 23 is a flowchart illustrating operations of the sound signal search apparatus 400. As shown in FIG. 22, the sound signal search apparatus 400 includes the latent variable generation unit 210, the data generation unit 220, the search unit 330, and the recording unit 390. The recording unit 390 is a component that records information necessary for processing by the sound signal search apparatus 400 as desired. The recording unit 390 records a sound signal database, a learned sound signal encoder, and a learned natural language representation decoder therein beforehand, for example.

In accordance with FIG. 23, operation of the sound signal search apparatus 400 is described. The sound signal search apparatus 400 takes an input sound signal as input and outputs a sound signal corresponding to the input sound signal.

In S210, the latent variable generation unit 210 takes an input sound signal as input, generates a latent variable corresponding to the input sound signal from the input sound signal using the learned sound signal encoder, and outputs it.

In S220, the data generation unit 220 takes as input the latent variable that was output in S210 and a condition concerning an index for a natural language representation, generates a natural language representation corresponding to the input sound signal (hereinafter referred to as a search natural language representation) from the latent variable and the condition concerning an index for a natural language representation using the learned natural language representation decoder, and outputs it. Here, the number of conditions concerning an index for a natural language representation for input is an integer equal to or greater than 0. When the number of conditions is 0, it means no condition concerning an index for a natural language representation is input. When the number of conditions is one or more, a random number generated by a random number generation unit (not shown) may be used as the index or a number entered by a user via an input unit (not shown) may be used as the index.

In S330, the search unit 330 takes as input the search natural language representation that was output in S220, determines a sound signal corresponding to the input sound signal as a search result from the search natural language representation using the sound signal database, and outputs it.

For example, when three or more conditions concerning indices are input, the data generation unit 220 generates search natural language representations for the respective conditions concerning indices (S220), and the search unit 330 determines a sound signal paired with the natural language representation contained in the sound signal database that has the highest degree of similarity with each of the generated search natural language representations, and determines a set of these sound signals as a search result. It is of course possible to determine one that has a degree of similarity equal to or greater than a predetermined threshold or greater than a predetermined threshold, instead of determining the one with the highest degree of similarity.

This embodiment of the present invention enables a search for a sound signal corresponding to the sound signal with the sound signal database using the sound signal as a query.

Fourth Embodiment

In the following description, a domain is intended to mean a set of data of a certain type. Examples of domains include a sound signal domain, which is a set of sound signals as used in the first embodiment, and a natural language representation domain, which is a set of natural language representations as used in the first embodiment, for example. An example of data of domains is various kinds of signals that can be acquired with a gustatory sensor, an olfactory sensor, a tactile sensor, a camera, and the like as described in <Technical background>. These signals are signals related to the five senses of the human being and will be referred to as signals based on sensory information, including sound signals.

«Data Generation Model Learning Apparatus 1100»

A data generation model learning apparatus 1100 performs learning of a data generation model using learning data. The learning data includes the first learning data, which is pairs of data of a first domain and data of a second domain corresponding to the data of the first domain, and the second learning data, which is pairs of indices for the data of the second domain and data of the second domain corresponding to the indices. The data generation model refers to a function that takes as input data of the first domain and a condition concerning an index for data of the second domain and generates and outputs data of the second domain corresponding to the data of the first domain. The data generation model is constructed as a pair of an encoder for generating a latent variable corresponding to the data of the first domain from the data of the first domain and a decoder for generating data of the second domain corresponding to the data of the first domain from the latent variable and the condition concerning an index for the data of the second domain. The condition concerning an index for the data of the second domain means an index required for the data of the second domain to be generated, and the required index may be designated with a single numerical value or with a range. The encoder and the decoder can be any kind of neural networks that can process data of the first domain and data of the second domain.

Figure 24:
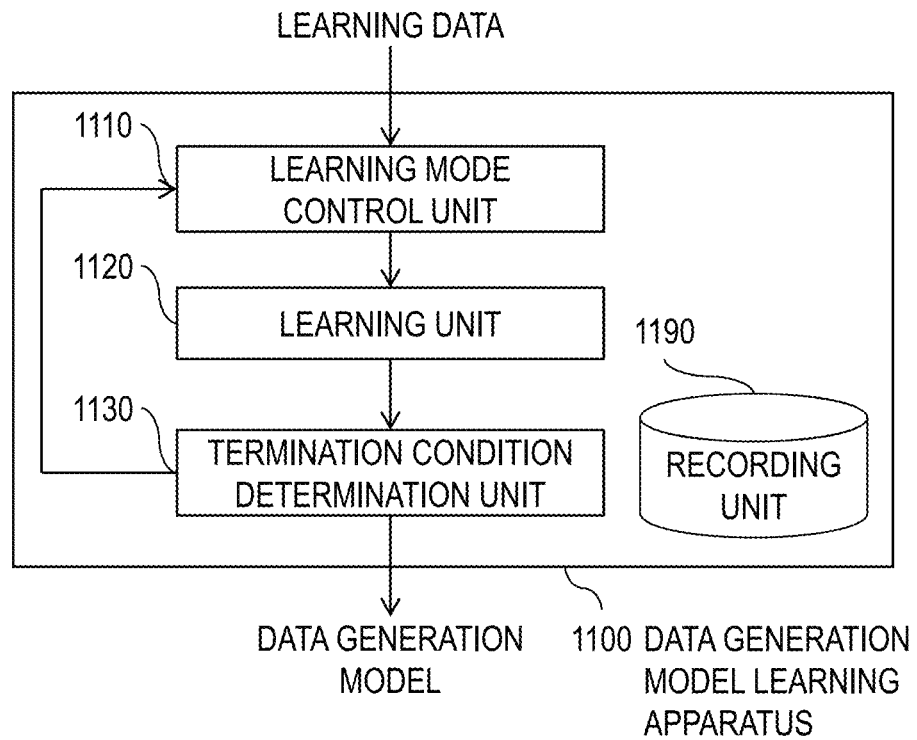
FIG. 24 is a block diagram showing a configuration of a data generation model learning apparatus 1100.
Figure 25:
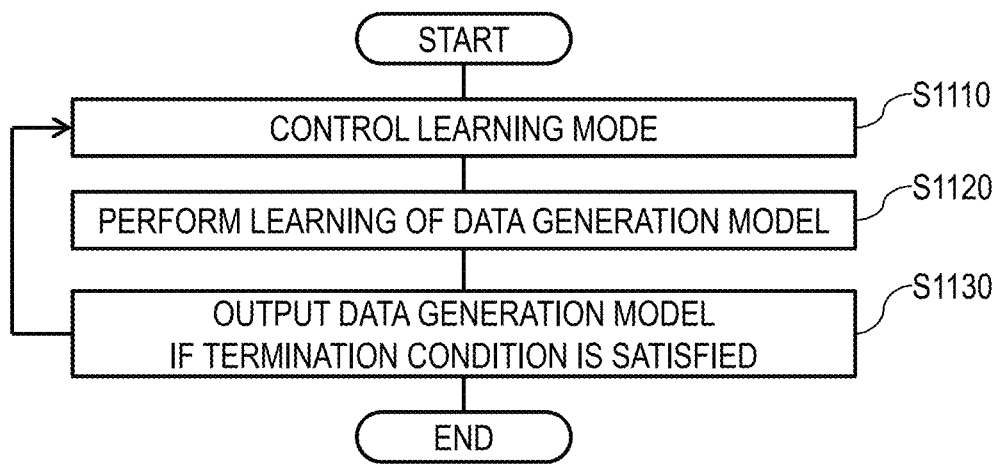
FIG. 25 is a flowchart illustrating operations of the data generation model learning apparatus 1100.

Now referring to FIGS. 24 and 25, the data generation model learning apparatus 1100 is described. FIG. 24 is a block diagram showing a configuration of the data generation model learning apparatus 1100. FIG. 25 is a flowchart illustrating operations of the data generation model learning apparatus 1100. As shown in FIG. 24, the data generation model learning apparatus 1100 includes a learning mode control unit 1110, a learning unit 1120, a termination condition determination unit 1130, and a recording unit 1190. The recording unit 1190 is a component that records information necessary for processing by the data generation model learning apparatus 1100 as desired. The recording unit 1190 records learning data therein before learning is started, for example.

In accordance with FIG. 25, operation of the data generation model learning apparatus 1100 is described. The data generation model learning apparatus 1100 takes as input the first learning data, an index for the data of the second domain as an element of the first learning data, and the second learning data, and outputs a data generation model. The index for the data of the second domain as an element of the first learning data may also be determined by the learning unit 1120 from the data of the second domain as an element of the first learning data, instead of being input.

In S1110, the learning mode control unit 1110 takes as input the first learning data, an index for the data of the second domain as an element of the first learning data, and the second learning data, and generates and outputs a control signal for controlling the learning unit 1120. Here, the control signal is a signal to control learning mode so that either of the first learning and the second learning is executed. The control signal can be a signal to control the learning mode so that the first learning and the second learning are alternately executed, for example. The control signal can also be a signal to control the learning mode so as to execute the first learning and the second learning such that the two types of learning are mixed in a certain manner, for example. In that case, the number of times the first learning is executed and the number of times the second learning is executed may be different values.

In S1120, the learning unit 1120 takes as input the first learning data, the index for the data of the second domain as an element of the first learning data, the second learning data, and the control signal that was output in S1110. When the learning designated by the control signal is the first learning, the learning unit 1120 uses the first learning data and the index for the data of the second domain as an element of the first learning data to perform learning of an encoder for generating a latent variable corresponding to the data of the first domain from the data of the first domain and a decoder for generating data of the second domain corresponding to the data of the first domain from the latent variable and the condition concerning an index for the data of the second domain. When the learning designated by the control signal is the second learning, the learning unit 1120 uses the second learning data to perform learning of the decoder. And the learning unit 1120 outputs a data generation model which is a pair of the encoder and the decoder, with information necessary for the termination condition determination unit 1130 to make a determination on the termination condition (for example, the number of times learning has been performed). The learning unit 1120 executes learning in units of epoch regardless of whether the learning being executed is the first learning or the second learning. The learning unit 1120 also performs learning of the data generation model by error backpropagation with the predetermined error function L. The error function L is defined by the formula below when the learning to be executed is the first learning, where λ is a predetermined constant.

$$L = L_1 + \lambda L_2$$

When the learning to be executed is the second learning, it is defined by the formula below, where λ' is a constant that satisfies λ'<1.

$$L = \lambda' L_1 + \lambda L_2$$

Here, the error $L_1$ related to the data of the second domain is, when the learning to be executed is the first learning, a cross-entropy calculated from data of the second domain which is the output of the data generation model for the data of the first domain as an element of the first learning data and data of the second domain as an element of the first learning data, and is, when the learning to be executed is the second learning, a cross-entropy calculated from data of the second domain which is the output of the decoder for the index as an element of the second learning data and data of the second domain as an element of the second learning data.

The error function L may be any function that is defined with the two errors, $L_1$ and $L_2$.

Data of the second domain as an element of the second learning data are those data of the second domain that have an index close to an index as an element of the second learning data (that is, with a difference from the index being smaller than a predetermined threshold or equal to or smaller than a predetermined threshold).

An estimated index $\hat{I}_s$ of data s of the second domain as the output of the decoder is defined as:

$$\hat{I}_s = \sum_t E(I_{w_{t,j}})$$

$$E(I_{w_{t,j}}) = \sum_j I_{w_{t,j}} p(w_{t,j})$$

(where the value $p(w_{t,j})$ of the unit j of the output layer of the decoder at time t is the probability of generation of data $w_{t,j}$ of the second domain corresponding to the unit j, and $I_{w\_t,j}$ is the information content of the data $w_{t,j}$ of the second domain, which is determined based on the probability of generation $p_{w\_t,j}$ of the data $w_{t,j}$ of the second domain), and the error $L_2$ related to the index for the data of the second domain is, when the learning to be executed is the first learning, the difference between the estimated index $\hat{I}_s$ and the index for the data of the second domain as an element of the first learning data, and is, when the learning to be executed is the second learning, the difference between the estimated index $\hat{I}_s$ and the index as an element of the second learning data.

In S1130, the termination condition determination unit 1130 takes as input the data generation model that was output at S1120 and information necessary for determining the termination condition that was output at S1120 and determines whether the termination condition, which is a condition concerning termination of learning, is satisfied or not (for example, the number of times learning has been performed has reached a predetermined number of iterations). If the termination condition is satisfied, the termination condition determination unit 1130 outputs the data generation model and ends the processing. On the other hand, if the termination condition is not satisfied, it returns to the processing of S1110.

«Data Generation Model Learning Apparatus 1150»

A data generation model learning apparatus 1150 performs learning of a data generation model using learning data. The data generation model learning apparatus 1150 is different from the data generation model learning apparatus 1100 in that it executes only the first learning using the first learning data.

Figure 26:
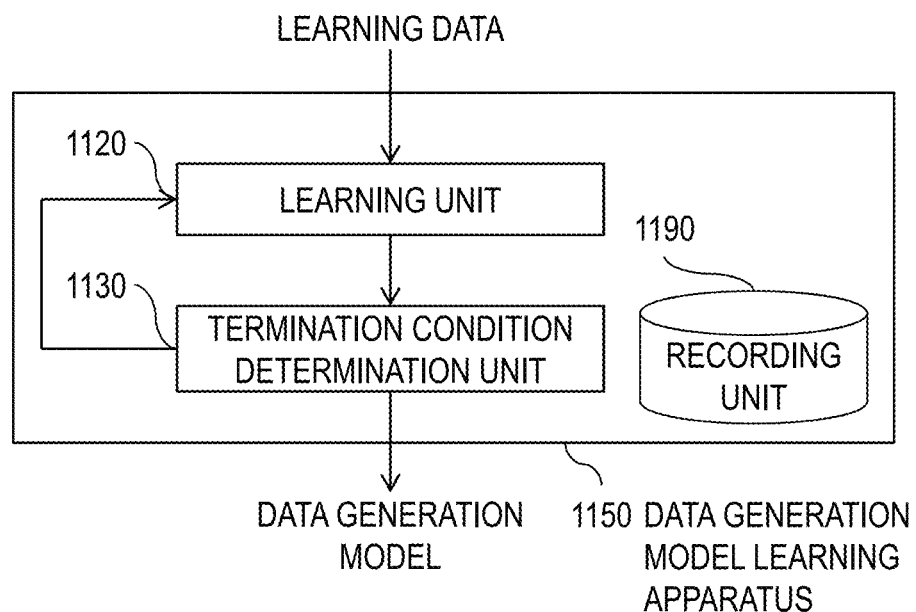
FIG. 26 is a block diagram showing a configuration of a data generation model learning apparatus 1150.
Figure 27:
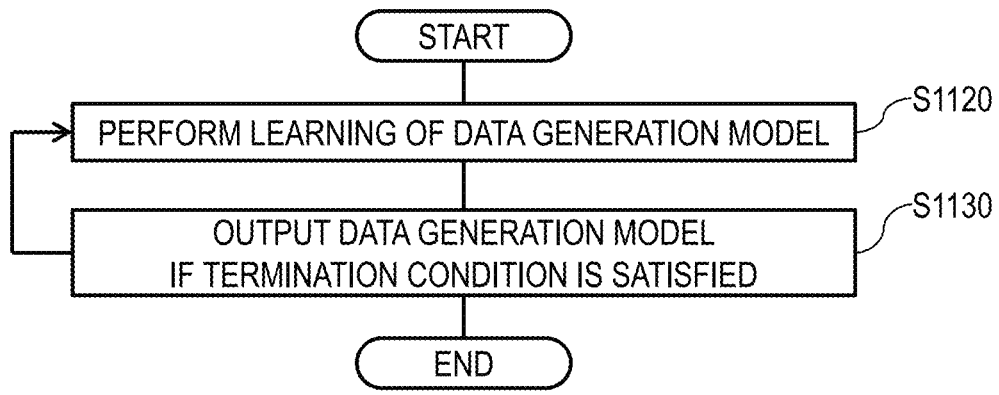
FIG. 27 is a flowchart illustrating operations of the data generation model learning apparatus 1150.

Now referring to FIGS. 26 and 27, the data generation model learning apparatus 1150 is described. FIG. 26 is a block diagram showing a configuration of the data generation model learning apparatus 1150. FIG. 27 is a flowchart illustrating operations of the data generation model learning apparatus 1150. As shown in FIG. 26, the data generation model learning apparatus 1150 includes the learning unit 1120, the termination condition determination unit 1130, and the recording unit 1190. The recording unit 1190 is a component that records information necessary for processing by the data generation model learning apparatus 1150 as desired.

In accordance with FIG. 27, operation of the data generation model learning apparatus 1150 is described. The data generation model learning apparatus 1150 takes as input the first learning data and an index for the data of the second domain as an element of the first learning data, and outputs a data generation model. An index for the data of the second domain as an element of the first learning data may also be determined by the learning unit 1120 from the data of the second domain as an element of the first learning data, instead of being input.

In S1120, the learning unit 1120 takes as input the first learning data and an index for the data of the second domain as an element of the first learning data, performs learning of the encoder and the decoder using the first learning data and the index for the data of the second domain as an element of the first learning data, and outputs the data generation model which is a pair of the encoder and the decoder, with information necessary for the termination condition determination unit 1130 to make a determination on the termination condition (for example, the number of times learning has been performed). The learning unit 1120 executes learning in units of epoch, for example. The learning unit 1120 also performs learning of the data generation model by error backpropagation with the error function L. The error function L is defined by the formula below, where λ is a predetermined constant.

$$L = L_1 + L_2$$

The definition of the two errors $L_1$ and $L_2$ is the same as that for the data generation model learning apparatus 1100. The error function L may be any function that is defined with the two errors, $L_1$ and $L_2$.

In S1130, the termination condition determination unit 1130 takes as input the data generation model that was output at S1120 and information necessary for determining the termination condition that was output at S1120 and determines whether the termination condition, which is a condition concerning termination of learning, is satisfied or not (for example, the number of times learning has been performed has reached a predetermined number of iterations). If the termination condition is satisfied, the termination condition determination unit 1130 outputs the data generation model and ends the processing. On the other hand, if the termination condition is not satisfied, it returns to the processing of S1120.

«Data Generation Apparatus 1200»

A data generation apparatus 1200 generates data of the second domain corresponding to data of the first domain from the data of the first domain and a condition concerning an index for the data of the second domain, using a data generation model learned with the data generation model learning apparatus 1100 or the data generation model learning apparatus 1150. A data generation model learned with the data generation model learning apparatus 1100 or the data generation model learning apparatus 1150 is also referred to as a learned data generation model. The encoder and the decoder constituting a learned data generation model are also referred to as a learned encoder and a learned decoder, respectively. It is of course possible to use a data generation model learned with a data generation model learning apparatus other than the data generation model learning apparatus 1100 or the data generation model learning apparatus 1150.

Figure 28:
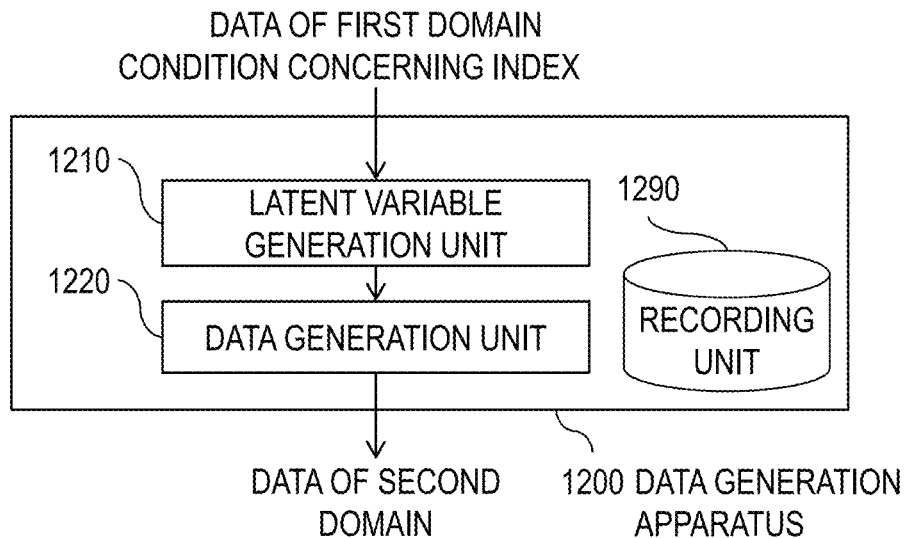
FIG. 28 is a block diagram showing a configuration of a data generation apparatus 1200.
Figure 29:
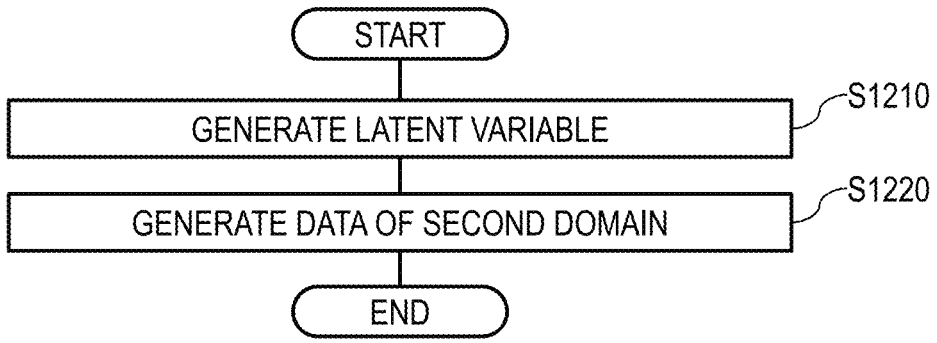
FIG. 29 is a flowchart illustrating operations of the data generation apparatus 1200.

Now referring to FIGS. 28 and 29, the data generation apparatus 1200 is described. FIG. 28 is a block diagram showing a configuration of the data generation apparatus 1200. FIG. 29 is a flowchart illustrating operations of the data generation apparatus 1200. As shown in FIG. 28, the data generation apparatus 1200 includes a latent variable generation unit 1210, a data generation unit 1220, and a recording unit 1290. The recording unit 1290 is a component that records information necessary for processing by the data generation apparatus 1200 as desired. The recording unit 1290 records a learned data generation model (that is, a learned encoder and a learned decoder) therein beforehand, for example.

In accordance with FIG. 29, operation of the data generation apparatus 1200 is described. The data generation apparatus 1200 takes as input data of the first domain and a condition concerning an index for the data of the second domain and outputs data of the second domain.

In S1210, the latent variable generation unit 1210 takes data of the first domain as input, generates a latent variable corresponding to the data of the first domain from the data of the first domain using the learned encoder, and outputs it.

In S1220, the data generation unit 1220 takes as input the latent variable that was output in S1210 and a condition concerning an index for the data of the second domain, generates data of the second domain corresponding to the data of the first domain from the latent variable and the condition concerning an index for the data of the second domain using the learned decoder, and outputs it.

SPECIFIC EXAMPLES

Specific examples are now shown, where the data of the first domain is signals based on sensory information and the data of the second domain is sentences or phrases.

(1) Gustatory Sense

In this case, a descriptive sentence on a production area associated with taste, for example, can be obtained from a signal provided by a gustatory sensor. A descriptive sentence on a production area associated with taste can be a descriptive sentence like "2015 Koshu wine," for example.

(2) Olfactory Sense

In this case, a descriptive sentence on smell can be obtained from a signal provided by an olfactory sensor.

(3) Tactile Sense

In this case, a descriptive sentence on hardness or texture, for example, can be obtained from a signal provided by a tactile sensor or a hardness sensor.

(4) Visual Sense

In this case, a caption for a moving image or a descriptive sentence on a subject in an image, for example, can be obtained from a signal provided by an image sensor such as a camera.

This embodiment of the present invention enables learning of a data generation model for generating data of the second domain corresponding to data of the first domain from the data of the first domain, using an index for data of the second domain as auxiliary input. This embodiment of the present invention also enables generation of data of the second domain corresponding to data of the first domain from the data of the first domain while controlling a predetermined index.

Fifth Embodiment

The encoder and the decoder constituting a data generation model learned with the data generation model learning apparatus 1100 or the data generation model learning apparatus 1150 are hereinafter referred to as a first domain encoder and a natural language representation decoder, respectively. The first domain encoder and the natural language representation decoder may also be referred to as a learned first domain encoder and a learned natural language representation decoder, respectively. The data generation model may also be referred to as a natural language representation generation model.

This section first describes a database generation apparatus 1250, which generates a first domain database with a data generation model.

«Database Generation Apparatus 1250»

The database generation apparatus 1250 generates the first domain database from (multiple) pair(s) of data of the first domain and a condition concerning an index for a natural language representation, using a learned data generation model.

Figure 30:
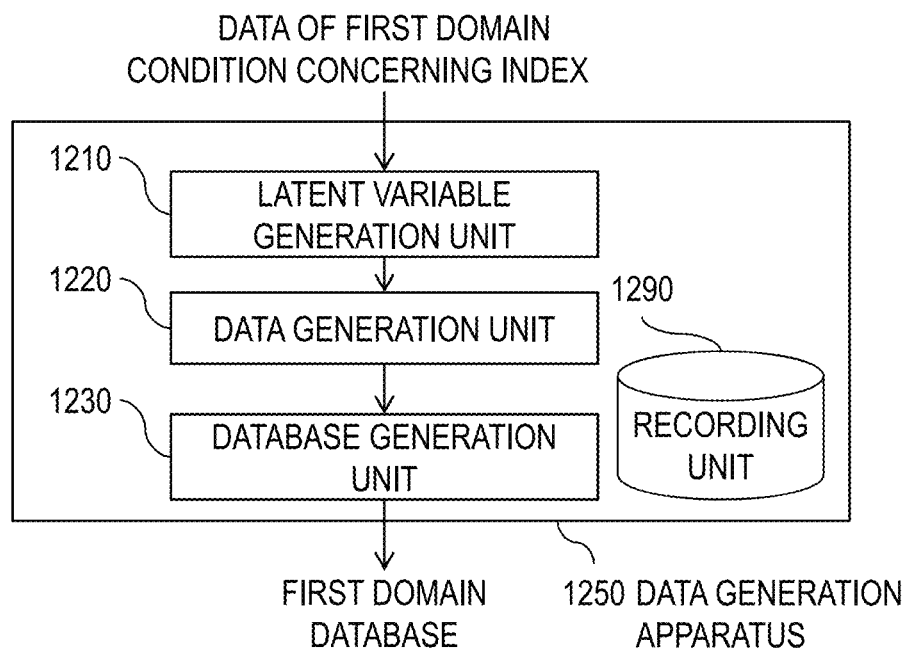
FIG. 30 is a block diagram showing a configuration of a database generation apparatus 1250.
Figure 31:
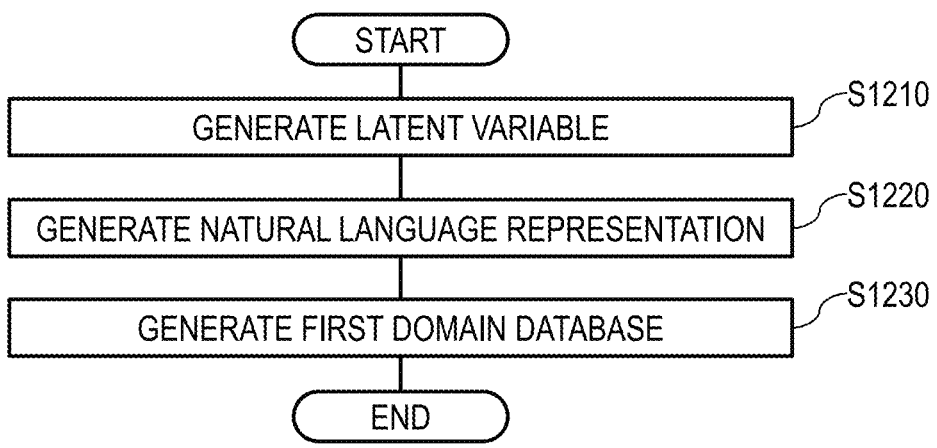
FIG. 31 is a flowchart illustrating operations of the database generation apparatus 1250.

Now referring to FIGS. 30 and 31, the database generation apparatus 1250 is described. FIG. 30 is a block diagram showing a configuration of the database generation apparatus 1250. FIG. 31 is a flowchart illustrating operations of the database generation apparatus 1250. As shown in FIG. 30, the database generation apparatus 1250 includes the latent variable generation unit 1210, the data generation unit 1220, a database generation unit 1230, and the recording unit 1290. The recording unit 1290 is a component that records information necessary for processing by the database generation apparatus 1250 as desired. The recording unit 1290 records a learned data generation model (that is, a learned first domain encoder and a learned natural language representation decoder) therein beforehand, for example.

In accordance with FIG. 31, operation of the database generation apparatus 1250 is described. The database generation apparatus 1250 takes as input a pair of data of the first domain and a condition concerning an index for a natural language representation and outputs a first domain database. (Multiple) pair(s) of data of the first domain and a condition concerning an index for a natural language representation for input may be recorded in a recording device outside the database generation apparatus 1250 and read therefrom or may be recorded in the recording unit 1290 and read therefrom.

In S1210, the latent variable generation unit 1210 takes data of the first domain as input, generates a latent variable corresponding to the data of the first domain from the data of the first domain using the learned first domain encoder, and outputs it.

In S1220, the data generation unit 1220 takes as input the latent variable that was output in S1210 and the condition concerning an index for a natural language representation, generates a natural language representation corresponding to the data of the first domain from the latent variable and the condition concerning an index for a natural language representation using the learned natural language representation decoder, and outputs it.

In S1230, the database generation unit 1230 takes as input the natural language representation corresponding to the data of the first domain that was output in S1220 and the input data of the first domain, generates a record including the natural language representation corresponding to the data of the first domain and the data of the first domain from the natural language representation corresponding to the data of the first domain and the data of the first domain, generates the first domain database made up of the record, and outputs it.

A pair of data of the first domain and a condition concerning an index for a natural language representation as the input may include a condition specifying different indices for one piece of data of the first domain. By generating the first domain database using such a pair, the first domain database will be constructed to include records containing natural language representations with different indices for one piece of data of the first domain and the data itself. In other words, when the first domain database has, for a piece of data of the first domain, two or more records containing that data, there are two or more kinds of indices for the natural language representations that are contained in those records.

«Data Search Apparatus 1300»

A data search apparatus 1300 uses the first domain database generated by the database generation apparatus 1250 to search for data of the first domain corresponding to a natural language representation being input (hereinafter referred to as an input natural language representation) from the input natural language representation.

Figure 32:
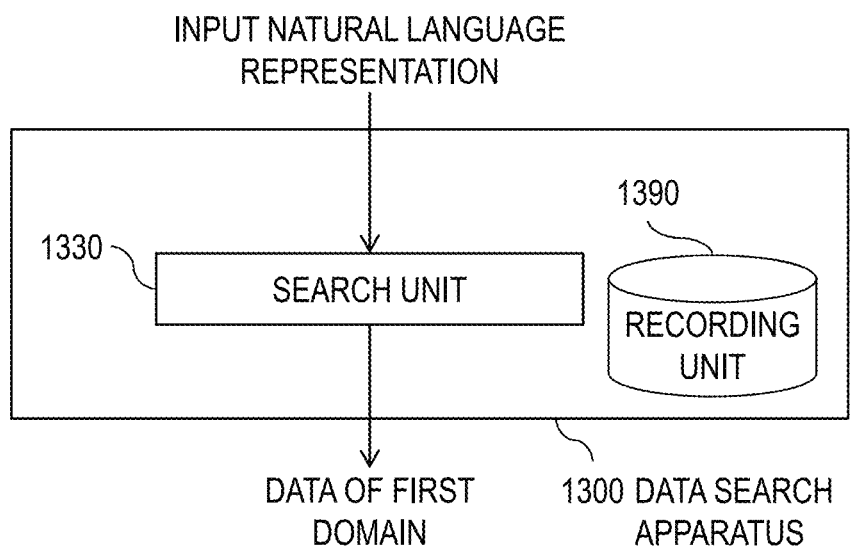
FIG. 32 is a block diagram showing a configuration of a data search apparatus 1300.
Figure 33:
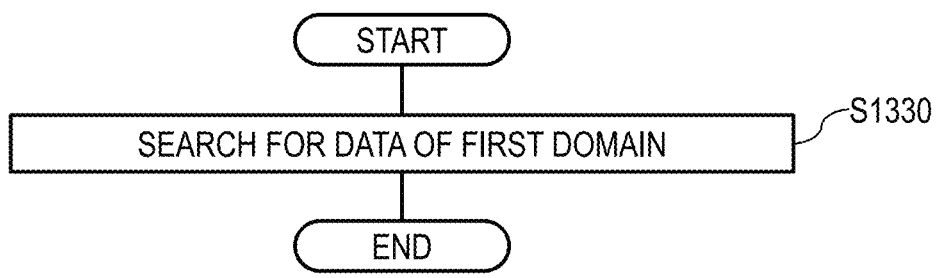
FIG. 33 is a flowchart illustrating operations of the data search apparatus 1300.

Referring to FIGS. 32 and 33, the data search apparatus 1300 is now described. FIG. 32 is a block diagram showing a configuration of the data search apparatus 1300. FIG. 33 is a flowchart illustrating operations of the data search apparatus 1300. As shown in FIG. 32, the data search apparatus 1300 includes a search unit 1330 and a recording unit 1390. The recording unit 1390 is a component that records information necessary for processing by the data search apparatus 1300 as desired. The recording unit 1390 records a first domain database therein beforehand, for example.

In accordance with FIG. 33, operation of the data search apparatus 1300 is described. The data search apparatus 1300 takes an input natural language representation as input and outputs data of the first domain corresponding to the input natural language representation.

In S1330, the search unit 1330 takes an input natural language representation as input, determines data of the first domain corresponding to the input natural language representation as a search result from the input natural language representation using the first domain database, and outputs it. Here, the search unit 330 determines the search result by calculating a degree of similarity between the input natural language representation and a natural language representation contained in the first domain database.

This embodiment of the present invention enables accurate and efficient generation of a database useable in text-based data search. Specifically, it is possible to generate a first domain database made up of records each including a natural language representation generated with a data generation model and describing the features of data of the first domain and the data itself. This embodiment of the present invention also enables a search for data of the first domain corresponding to a natural language representation related to desired data of the first domain with the first domain database using the natural language representation as a query.

Sixth Embodiment

«Data Search Apparatus 1400»

A data search apparatus 1400 uses the first domain database generated by the database generation apparatus 1250 to search for data of the first domain corresponding to data of the first domain being input (hereinafter referred to as input first domain data) from the input first domain data.

Figure 34:
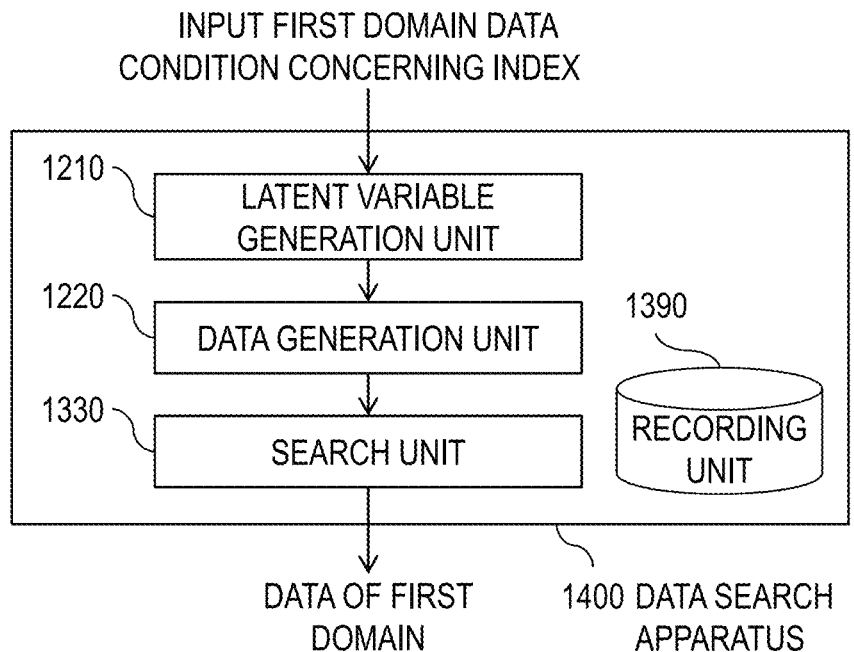
FIG. 34 is a block diagram showing a configuration of a data search apparatus 1400.
Figure 35:
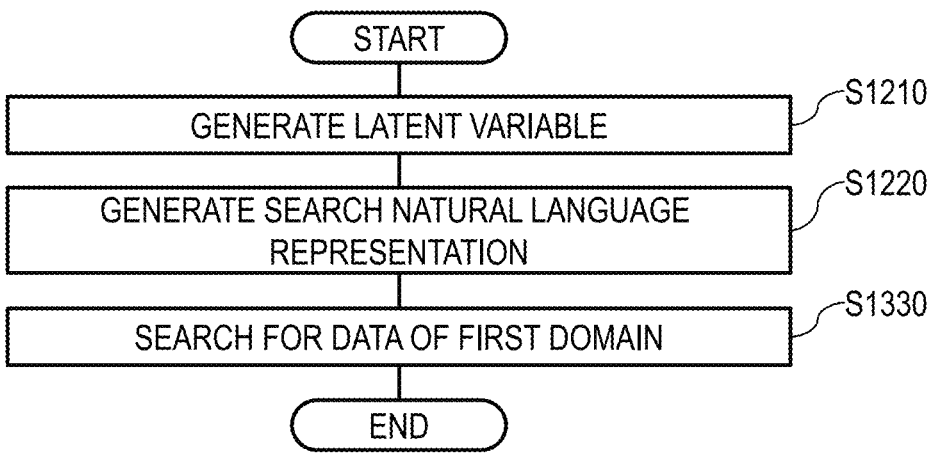
FIG. 35 is a flowchart illustrating operations of the data search apparatus 1400.

Referring to FIGS. 34 and 35, the data search apparatus 1400 is described. FIG. 34 is a block diagram showing a configuration of the data search apparatus 1400. FIG. 35 is a flowchart illustrating operations of the data search apparatus 1400. As shown in FIG. 34, the data search apparatus 1400 includes the latent variable generation unit 1210, the data generation unit 1220, the search unit 1330, and the recording unit 1390. The recording unit 1390 is a component that records information necessary for processing by the data search apparatus 1400 as desired. The recording unit 1390 records the first domain database, a learned first domain encoder, and a learned natural language representation decoder therein beforehand, for example.

In accordance with FIG. 35, operation of the data search apparatus 1400 is described. The data search apparatus 1400 takes the input first domain data as input and outputs data of the first domain corresponding to the input first domain data.

In S1210, the latent variable generation unit 1210 takes the input first domain data as input, generates a latent variable corresponding to the input first domain data from the input first domain data using the learned first domain encoder, and outputs it.

In S1220, the data generation unit 1220 takes as input the latent variable that was output in S1210 and a condition concerning an index for a natural language representation, generates a natural language representation corresponding to the input first domain data (hereinafter referred to as a search natural language representation) from the latent variable and the condition concerning an index for a natural language representation using the learned natural language representation decoder, and outputs it. Here, the number of conditions concerning an index for a natural language representation for input is an integer equal to or greater than 0. When the number of conditions is 0, it means no condition concerning an index for a natural language representation is input. When the number of conditions is one or more, a random number generated by a random number generation unit (not shown) may be used as the index or a number entered by a user via an input unit (not shown) may be used as the index.

In S1330, the search unit 1330 takes as input the search natural language representation that was output in S1220, determines data of the first domain corresponding to the input first domain data as a search result from the search natural language representation using the first domain database, and outputs it.

This embodiment of the present invention enables a search for data of the first domain corresponding to the data of the first domain with the first domain database using the data of the first domain as a query.

APPENDIX

The apparatus according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the apparatus executing the processing or any necessity.

As already mentioned, when the processing functions of the hardware entities described in the embodiments (the apparatus of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A sound signal database generation apparatus comprising:
   processing circuitry configured to: execute
   a latent variable generation processing that generates, from a sound signal, a latent variable corresponding to the sound signal, the latent variable being a fixed-length vector which is a distributed representation of sound, using a sound signal encoder;
   a data generation processing that generates a natural language representation corresponding to the sound signal from the latent variable and a condition concerning an index for a natural language representation using a natural language representation decoder; and
   a sound signal database generation processing that generates a record including the natural language representation corresponding to the sound signal and the sound signal from the natural language representation corresponding to the sound signal and the sound signal, and generates a sound signal database made up of the record, wherein
   the sound signal encoder and the natural language representation decoder constitute a data generation model that is a function that takes as input a sound signal and a condition concerning an index for a natural language representation and outputs a natural language representation corresponding to the sound signal.

2. The sound signal database generation apparatus according to claim 1, wherein
   when the sound signal database has, for a sound signal, two or more records containing the sound signal, there are two or more kinds of indices for the natural language representations that are contained in those records.

3. A sound signal search apparatus comprising:
   processing circuitry configured to: execute
   a recording processing that records a sound signal database made up of records each including a natural language representation corresponding to a sound signal and the sound signal, the natural language representation being generated from the sound signal using a data generation model, the data generation model being a function that takes as input a sound signal and a condition concerning an index for a natural language representation and outputs a natural language representation corresponding to the sound signal and including a sound signal encoder that generates, from a sound signal, a latent variable corresponding to the sound signal, the latent variable being a fixed-length vector which is a distributed representation of sound, and a natural language representation decoder that generates a natural language representation corresponding to the sound signal from the latent variable and a condition concerning an index for a natural language representation; and
   a search processing that determines a sound signal corresponding to a natural language representation being input (hereinafter referred to as an input natural language representation) as a search result from the input natural language representation using the sound signal database.

4. A sound signal search apparatus comprising:
   processing circuitry configured to: execute
   a recording processing that records a sound signal database made up of records each including a natural language representation corresponding to a sound signal and the sound signal, the natural language representation being generated from the sound signal using a data generation model, the data generation model being a function that takes as input a sound signal and a condition concerning an index for a natural language representation and outputs a natural language representation corresponding to the sound signal and including a sound signal encoder that generates, from a sound signal, a latent variable corresponding to the sound signal, the latent variable being a fixed-length vector which is a distributed representation of sound, and a natural language representation decoder that generates a natural language representation corresponding to the sound signal from the latent variable and a condition concerning an index for a natural language representation;
   a latent variable generation processing that generates, from a sound signal being input (hereinafter referred to as an input sound signal), a latent variable corresponding to the input sound signal using the sound signal encoder;
   a data generation processing that generates a natural language representation corresponding to the input sound signal (hereinafter referred to as a search natural language representation) from the latent variable and a condition concerning an index for a natural language representation using the natural language representation decoder; and
   a search processing that determines a sound signal corresponding to the input sound signal as a search result from the search natural language representation using the sound signal database.

5. The sound signal search apparatus according to claim 3 or 4, wherein
   when the sound signal database has, for a sound signal, two or more records containing the sound signal, there are two or more kinds of indices for the natural language representations that are contained in those records.

6. A sound signal database generation method comprising:
   a latent variable generation step in which a sound signal database generation apparatus generates, from a sound signal, a latent variable corresponding to the sound signal, the latent variable being a fixed-length vector which is a distributed representation of sound, using a sound signal encoder;

a data generation step in which the sound signal database generation apparatus generates a natural language representation corresponding to the sound signal from the latent variable and a condition concerning an index for a natural language representation using a natural language representation decoder; and a sound signal database generation step in which the sound signal database generation apparatus generates a record including the natural language representation corresponding to the sound signal and the sound signal from the natural language representation corresponding to the sound signal and the sound signal, and generates a sound signal database made up of the records wherein the sound signal encoder and the natural language representation decoder constitute a data generation model that is a function that takes as input a sound signal and a condition concerning an index for a natural language representation and outputs a natural language representation corresponding to the sound signal.

7. A sound signal search method comprising:

a search step in which a sound signal search apparatus determines a sound signal corresponding to a natural language representation being input (hereinafter referred to as an input natural language representation) as a search result from the input natural language representation using a sound signal database, the sound signal search apparatus including a recording unit that records the sound signal database made up of records each including a natural language representation corresponding to a sound signal and the sound signal, the natural language representation being generated from the sound signal using a data generation model, the data generation model being a function that takes as input a sound signal and a condition concerning an index for a natural language representation and outputs a natural language representation corresponding to the sound signal and including a sound signal encoder that generates, from a sound signal, a latent variable corresponding to the sound signal, the latent variable being a fixed-length vector which is a distributed representation of sound, and a natural language representation decoder that generates a natural language representation corresponding to the sound signal from the latent variable and a condition concerning an index for a natural language representation.

8. A sound signal search method comprising:

a latent variable generation step in which a sound signal search apparatus generates, from a sound signal being input (hereinafter referred to as an input sound signal), a latent variable corresponding to the input sound signal using a sound signal encoder, the sound signal search apparatus including a recording unit that records a sound signal database made up of records each including a natural language representation corresponding to a sound signal and the sound signal, the natural language representation being generated from the sound signal using a data generation model, the data generation model being a function that takes as input a sound signal and a condition concerning an index for a natural language representation and outputs a natural language representation corresponding to the sound signal and including the sound signal encoder that generates, from a sound signal, a latent variable corresponding to the sound signal, the latent variable being a fixed-length vector which is a distributed representation of sound, and a natural language representation decoder that generates a natural language representation corresponding to the sound signal from the latent variable and a condition concerning an index for a natural language representation;

a data generation step in which the sound signal search apparatus generates a natural language representation corresponding to the input sound signal (hereinafter referred to as a search natural language representation) from the latent variable and a condition concerning an index for a natural language representation using the natural language representation decoder; and a search step in which the sound signal search apparatus determines a sound signal corresponding to the input sound signal as a search result from the search natural language representation using the sound signal database.

9. A database generation apparatus comprising:

processing circuitry configured to: execute a latent variable generation processing that generates, from data of a first domain, a latent variable corresponding to the data of the first domain, the latent variable being a fixed-length vector which is a distributed representation of data of the first domain, using a first domain encoder;

a data generation processing that generates a natural language representation corresponding to the data of the first domain from the latent variable and a condition concerning an index for a natural language representation using a natural language representation decoder; and a database generation processing that generates a record including the natural language representation corresponding to the data of the first domain and the data of the first domain from the natural language representation corresponding to the data of the first domain and the data of the first domain, and generates a first domain database made up of the record, wherein the first domain encoder and the natural language representation decoder constitute a data generation model that is a function that takes as input data of the first domain and a condition concerning an index for a natural language representation and outputs a natural language representation corresponding to the data of the first domain.

10. The database generation apparatus according to claim 9, wherein the data of the first domain is a sound signal having no linguistic meaning.

11. The database generation apparatus according to claim 9, wherein the data of the first domain is a signal associated with visual sense.

12. The database generation apparatus according to claim 9, wherein the data of the first domain is a signal associated with gustatory sense.

13. The database generation apparatus according to claim 9, wherein the data of the first domain is a signal associated with olfactory sense.

14. The database generation apparatus according to claim 9, wherein the data of the first domain is a signal associated with tactile sense.

15. The database generation apparatus according to claim 9, wherein the natural language representation is a phrase made up of two or more words without a subject and a predicate.

16. The database generation apparatus according to claim 9, wherein
the data of the first domain is a sound signal, and
the natural language representation is onomatopoeia.

17. The database generation apparatus according to claim 9, wherein
the data of the first domain is a sound signal, and
the natural language representation is representative of non-linguistic information carried by the sound signal.

18. A data search apparatus comprising:
processing circuitry configured to: execute
a recording processing that records a first domain database made up of records each including a natural language representation corresponding to data of a first domain and the data of the first domain, the natural language representation being generated from the data of the first domain using a data generation model, the data generation model being a function that takes as input data of the first domain and a condition concerning an index for a natural language representation and outputs a natural language representation corresponding to the data of the first domain and including a first domain encoder that generates, from data of the first domain, a latent variable corresponding to the data of the first domain, the latent variable being a fixed-length vector which is a distributed representation of data of the first domain, and a natural language representation decoder that generates a natural language representation corresponding to the data of the first domain from the latent variable and a condition concerning an index for a natural language representation; and
a search processing that determines data of the first domain corresponding to a natural language representation being input (hereinafter referred to as an input natural language representation) as a search result from the input natural language representation using the first domain database.

19. A data search apparatus comprising:
processing circuitry configured to: execute
a recording processing that records a first domain database made up of records each including a natural language representation corresponding to data of a first domain and the data of the first domain, the natural language representation being generated from the data of the first domain using a data generation model, the data generation model being a function that takes as input data of the first domain and a condition concerning an index for a natural language representation and outputs a natural language representation corresponding to the data of the first domain and including a first domain encoder that generates, from data of the first domain, a latent variable corresponding to the data of the first domain, the latent variable being a fixed-length vector which is a distributed representation of data of the first domain, and a natural language representation decoder that generates a natural language representation corresponding to the data of the first domain from the latent variable and a condition concerning an index for a natural language representation;
a latent variable generation processing unit that generates, from data of a first domain being input (hereinafter referred to as input first domain data), a latent variable corresponding to the input first domain data using the first domain encoder;
a data generation processing that generates a natural language representation corresponding to the input first domain data (hereinafter referred to as a search natural language representation) from the latent variable and a condition concerning an index for a natural language representation using the natural language representation decoder; and
a search processing that determines data of the first domain corresponding to the input first domain data as a search result from the search natural language representation using the first domain database.

20. A non-transitory computer-readable storage medium which stores a program for causing a computer to function as any of the sound signal database generation apparatus according to claim 1, the sound signal search apparatus according to claim 3 or 4, the database generation apparatus according to claim 9, and the data search apparatus according to claim 18 or 19.

21. A database generation method comprising:
a latent variable generation step in which a database generation apparatus generates, from data of a first domain, a latent variable corresponding to the data of the first domain, the latent variable being a fixed-length vector which is a distributed representation of data of the first domain, using a first domain encoder;
a data generation step in which the database generation apparatus generates a natural language representation corresponding to the data of the first domain from the latent variable and a condition concerning an index for a natural language representation using a natural language representation decoder; and
a database generation step in which the database generation apparatus generates a record including the natural language representation corresponding to the data of the first domain and the data of the first domain from the natural language representation corresponding to the data of the first domain and the data of the first domain, and generates a first domain database made up of the record,
wherein the first domain encoder and the natural language representation decoder constitute a data generation model that is a function that takes as input data of the first domain and a condition concerning an index for a natural language representation and outputs a natural language representation corresponding to the data of the first domain.

22. A data search method comprising:
a search step in which a data search apparatus determines data of a first domain corresponding to a natural language representation being input (hereinafter referred to as an input natural language representation) as a search result from the input natural language representation using a first domain database, the data search apparatus including a recording unit that records the first domain database made up of records each including a natural language representation corresponding to data of the first domain and the data of the first domain, the natural language representation being generated from the data of the first domain using a data generation model, the data generation model being a function that takes as input data of the first domain and a condition concerning an index for a natural language representation and outputs a natural language representation corresponding to the data of the first domain and including a first domain encoder that generates, from data of the first domain, a latent variable corresponding to the data of the first domain, the latent variable being a fixed-length vector which is a distributed representation of data of the first domain, and a natural language representation decoder that generates a natural language representation corresponding to the data of the first domain from the latent variable and a condition concerning an index for a natural language representation.

23. A data search method comprising:
a latent variable generation step in which a data search apparatus generates, from data of a first domain being input (hereinafter referred to as input first domain data), a latent variable corresponding to the input first domain data using a first domain encoder, the data search apparatus including a recording unit that records a first domain database made up of records each including a natural language representation corresponding to data of a first domain and the data of the first domain, the natural language representation being generated from the data of the first domain using a data generation model, the data generation model being a function that takes as input data of the first domain and a condition concerning an index for a natural language representation and outputs a natural language representation corresponding to the data of the first domain and including the first domain encoder that generates, from data of the first domain, a latent variable corresponding to the data of the first domain, the latent variable being a fixed-length vector which is a distributed representation of data of the first domain, and a natural language representation decoder that generates a natural language representation corresponding to the data of the first domain from the latent variable and a condition concerning an index for a natural language representation;
a data generation step in which the data search apparatus generates a natural language representation corresponding to the input first domain data (hereinafter referred to as a search natural language representation) from the latent variable and a condition concerning an index for a natural language representation using the natural language representation decoder; and
a search step in which the data search apparatus determines data of the first domain corresponding to the input first domain data as a search result from the search natural language representation using the first domain database.

* * * * *